US012601836B2

(12) United States Patent
Umehara

(10) Patent No.: US 12,601,836 B2
(45) Date of Patent: Apr. 14, 2026

(54) RADIO-WAVE SENSOR INSTALLATION ASSISTANCE DEVICE, COMPUTER PROGRAM, AND RADIO-WAVE SENSOR INSTALLATION POSITION DETERMINATION METHOD

(71) Applicant: Sumitomo Electric Industries, Ltd., Osaka (JP)

(72) Inventor: Shigeki Umehara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 158 days.

(21) Appl. No.: 18/725,149

(22) PCT Filed: Dec. 6, 2022

(86) PCT No.: PCT/JP2022/044917
§ 371 (c)(1),
(2) Date: Jun. 28, 2024

(87) PCT Pub. No.: WO2023/135985
PCT Pub. Date: Jul. 20, 2023

(65) Prior Publication Data
US 2025/0060479 A1    Feb. 20, 2025

(30) Foreign Application Priority Data
Jan. 13, 2022    (JP) ................................. 2022-003559

(51) Int. Cl.
*G01S 13/931* (2020.01)
*G01S 7/06* (2006.01)
*G01S 13/89* (2006.01)

(52) U.S. Cl.
CPC .............. *G01S 13/931* (2013.01); *G01S 7/06* (2013.01); *G01S 13/89* (2013.01); *G01S 2013/9316* (2020.01)

(58) Field of Classification Search
None
See application file for complete search history.

(56) References Cited

U.S. PATENT DOCUMENTS

2022/0130254 A1* 4/2022 Austin .................... H04W 4/46
2024/0027605 A1* 1/2024 Goldhammer ........... G08G 1/04
(Continued)

FOREIGN PATENT DOCUMENTS

EP         2390860 A1    11/2011
JP    2001042759 A  *  2/2001
(Continued)

OTHER PUBLICATIONS

AGD Systems, "Pedestrian Detection On-Crossing", Available Online at: http://www.trafficsolutions.ie/wp-content/uploads/2012/04/AGD226-DATA.pdf >, 2012, 2 pages.

*Primary Examiner* — Gelek W Topgyal
(74) *Attorney, Agent, or Firm* — XSENSUS LLP

(57) ABSTRACT

A radio-wave sensor installation assistance device includes: a target position determination unit that determines a target position to be irradiated with a radio wave emitted from a radio-wave sensor, in an image including a crosswalk; a candidate position designation unit that receives designation of a candidate position to install the radio-wave sensor; and a display control unit that causes a display device to display a radio-wave irradiation range of the radio-wave sensor so as to be superimposed on the image, the radio-wave irradiation range being determined based on the target position and the candidate position. The candidate position designation unit can receive an instruction of a movement of the designated candidate position. The display control unit changes the shape of the radio-wave irradiation range according to the instructed movement of the candidate position, with the target position being fixed.

12 Claims, 23 Drawing Sheets

(56) References Cited

U.S. PATENT DOCUMENTS

| | | | |
|---|---|---|---|
| 2024/0103157 A1 * | 3/2024 | Higashida | G08G 1/01 |
| 2025/0060479 A1 * | 2/2025 | Umehara | G01S 13/91 |

FOREIGN PATENT DOCUMENTS

| | | | | |
|---|---|---|---|---|
| JP | 2007233770 A * | 9/2007 | | |
| JP | 2009080514 A * | 4/2009 | | |
| JP | 2012103191 A * | 5/2012 | | |
| JP | 2013097532 A * | 5/2013 | | |
| JP | 2015068746 A * | 4/2015 | | |
| JP | 2016181148 A * | 10/2016 | | |
| JP | 2023094087 A * | 7/2023 | | |
| WO | WO-2009080514 A1 * | 7/2009 | | B01J 23/84 |
| WO | WO-2021117304 A1 * | 6/2021 | | G08G 1/01 |
| WO | WO-2022168387 A1 * | 8/2022 | | G08G 1/04 |

* cited by examiner

ESTIMATED DETECTION AREA
DETERMINATION PROCESS

S201 — RECEIVE INPUT OF AREA DEFINITION POINT

S202 — DETERMINE ZEBRA AREA

S203 — DETERMINE ESTIMATED DETECTION AREA
AND EACH PARTIAL AREA

S204 — DISPLAY EACH PARTIAL AREA ON IMAGE

S205 — DETERMINE RADIO-WAVE
IRRADIATION TARGET POSITION

END

RADIO-WAVE SENSOR INSTALLATION ASSISTANCE DEVICE, COMPUTER PROGRAM, AND RADIO-WAVE SENSOR INSTALLATION POSITION DETERMINATION METHOD

CROSS-REFERENCE TO RELATED APPLICATIONS

This application is a national stage application, filed under 35 U.S.C. § 371, of International Patent Application No. PCT/JP2022/044917, filed Dec. 6, 2022, which claims priority from Japanese Patent Application No. 2022-003559, filed Jan. 13, 2022, the entire contents of each are incorporated herein by reference.

TECHNICAL FIELD

The present disclosure relates to a radio-wave sensor installation assistance device, a computer program, and a radio-wave sensor installation position determination method.

BACKGROUND ART

PATENT LITERATURE 1 discloses an axis adjustment device that adjusts an axis of an in-vehicle radar installed in a vehicle.

CITATION LIST

Patent Literature

PATENT LITERATURE 1: Japanese Laid-Open Patent Publication No. 2015-68746

SUMMARY OF THE INVENTION

A radio-wave sensor installation assistance device according to an aspect of the present disclosure includes: a target position determination unit configured to determine a target position to be irradiated with a radio wave emitted from a radio-wave sensor, in an image including a crosswalk; a candidate position designation unit configured to receive, from a user, designation of a candidate position that is a candidate for an installation position of the radio-wave sensor in the image; and a display control unit configured to cause a display device to display a radio-wave irradiation range of the radio-wave sensor so as to be superimposed on the image, the radio-wave irradiation range being determined based on the determined target position and the designated candidate position. The candidate position designation unit is able to receive, from the user, an instruction of a movement of the designated candidate position. When the candidate position designation unit has received the instruction of the movement, the display control unit changes the shape of the radio-wave irradiation range according to the instructed movement of the candidate position, with the target position being fixed.

The present disclosure can be realized not only as a radio-wave sensor installation assistance device having such a characteristic configuration as described above, but also as a computer program for causing a computer to function as the installation assistance device, an infrastructure radio-wave sensor installation assistance method including such characteristic processes as steps, and a radio-wave sensor installation assistance system including the installation assistance device.

DETAILED DESCRIPTION

Figure 1:
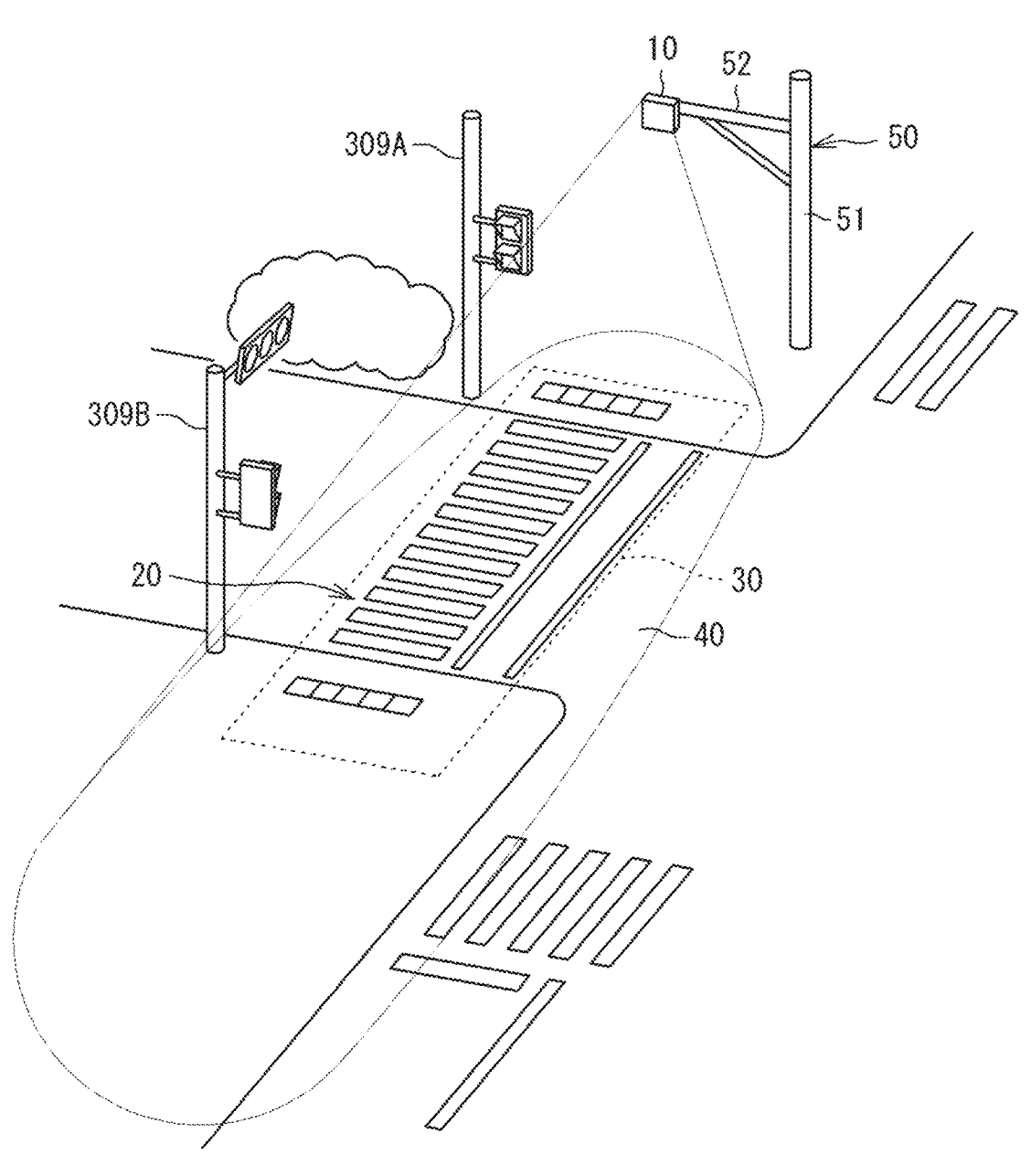
FIG. 1 shows a usage example of an infrastructure radio-wave sensor according to an embodiment.

Problems to be Solved by the Present Disclosure

A driving safety support system (DSSS) provides a traveling vehicle with vehicle and pedestrian information through road-to-vehicle communication at an intersection or the like where visibility is poor, and alerts a driver to prevent a traffic accident from occurring. For the purpose of such traffic monitoring, a radio-wave sensor (hereinafter also referred to as "infrastructure radio-wave sensor") is installed on a road or an intersection. In particular, an infrastructure radio-wave sensor for detecting pedestrians on a crosswalk is installed near an intersection, but many objects, such as utility poles, traffic lights, traffic signal controllers, buildings, and plants, which hinder installation of the sensor are present near the intersection. Since a radio-wave irradiation range changes according to the position of the infrastructure radio-wave sensor, there are positions not suitable for installation of the sensor. In order to determine an installation position of such an infrastructure radio-wave sensor, an operator inspects the site and determines a position suitable for installation of the sensor. Therefore, determination of the installation position of the infrastructure radio-wave sensor depends on the skill of the operator, and requires much cost and time.

Effects of the Present Disclosure

According to the present disclosure, it is possible to provide the user with information useful for installation of an infrastructure radio-wave sensor.

Description of Embodiment of the Present Disclosure

Hereinafter, the outline of an embodiment of the present disclosure will be listed and described.

(1) A radio-wave sensor installation assistance device according to the present embodiment includes: a target position determination unit configured to determine a target position to be irradiated with a radio wave emitted from a radio-wave sensor, in an image including a crosswalk: a candidate position designation unit configured to receive, from a user, designation of a candidate position that is a candidate for an installation position of the radio-wave sensor in the image; and a display control unit configured to cause a display device to display a radio-wave irradiation range of the radio-wave sensor so as to be superimposed on the image, the radio-wave irradiation range being determined based on the determined target position and the designated candidate position. The candidate position designation unit is able to receive, from the user, an instruction of a movement of the designated candidate position. When the candidate position designation unit has received the instruction of the movement, the display control unit changes the shape of the radio-wave irradiation range according to the instructed movement of the candidate position, with the target position being fixed. This allows the user to visually confirm the change in the shape of the radio-wave irradiation range when the candidate position is moved.

(2) In the above (1), the installation assistance device may include an input device for designating coordinates in the image. The candidate position designation unit may receive a continuous change in the coordinates designated in the input device by the user, as the instruction of the movement of the candidate position. The display control unit may change the shape of the radio-wave irradiation range according to the continuous change in the designated coordinates. This allows the user to confirm the change in the shape of the radio-wave irradiation range according to the continuous change in the coordinates.

(3) In the above (1) or (2), the display control unit may cause the display device to display a straight line or a line segment that connects the target position and the candidate position, so as to be superimposed on the image and the radio-wave irradiation range. This allows the user to visually confirm the reference direction of radio-wave irradiation that connects the target position and the candidate position.

(4) In the above (3), the straight line or the line segment may be an arrow directed from the candidate position to the target position. This allows the user to visually confirm from where to where the radio wave is emitted.

(5) In any one of the above (1) to (4), the display control unit may cause the display device to display a target detection area to be set as a detection area for the radio-wave sensor to detect an object, so as to be superimposed on the image and the radio-wave irradiation range. This allows the user to visually confirm overlapping between the target detection area and the radio-wave irradiation range.

(6) In the above (5), the target detection area may be divided into a plurality of partial areas, and the display control unit may cause the display device to display each of the plurality of partial areas so as to be superimposed on the image and the radio-wave irradiation range. This allows the user to visually recognize overlapping between each partial area and the radio-wave irradiation range.

(7) In any one of the above (1) to (6), the display control unit may display a non-irradiation range in which the radio wave emitted from the radio-wave sensor is blocked by an object, so as to be superimposed on the image. The display control unit may change the shape of the non-irradiation range, according to the instructed movement of the candidate position. This allows the user to visually confirm the change in the shape of the non-irradiation range when the candidate position is moved.

(8) In any one of the above (1) to (7), the display control unit may control the display device to display a mark that indicates an evaluation result of the candidate position as an installation position of the radio-wave sensor, at the candidate position in the image. This allows the user to visually confirm the evaluation result of the candidate position as an installation position.

(9) In the above (8), the candidate position designation unit may receive, from the user, designation of an area including a plurality of candidate positions in the image. The display control unit may cause the display device to display a plurality of marks corresponding to the respective candidate positions, in the area designated by the user in the image. This allows the user to visually recognize the evaluation result of each candidate position in the designated area.

(10) In the above (8) or (9), the display control unit may cause the display device to display the mark with a color according to a rank of the candidate position. This allows the user to visually confirm the rank of the candidate position.

(11) A computer program according to the present embodiment is a computer program that causes a computer to assist in installation of a radio-wave sensor. The computer program causes the computer to function as: a target position determination unit configured to determine a target position to be irradiated with a radio wave emitted from a radio-wave sensor, in an image including a crosswalk; a candidate position designation unit configured to receive, from a user, designation of a candidate position that is a candidate for an installation position of the radio-wave sensor; and a display control unit configured to cause a display device to display a radio-wave irradiation range of the radio-wave sensor so as to be superimposed on the image, the radio-wave irradiation range being determined based on the determined target position and the designated candidate position. The candidate position designation unit is able to receive, from the user, an instruction of a movement of the designated candidate position. When the candidate position designation unit has received the instruction of the movement, the display control unit changes the shape of the radio-wave irradiation range according to the instructed movement of the candidate position, with the target position being fixed. This allows the user to visually confirm the change in the shape of the radio-wave irradiation range when the candidate position is moved.

(12) A radio-wave sensor installation position determination method according to the present embodiment is a method for determining an installation position of a radio-wave sensor by using an installation assistance device that assists in installation of the radio-wave sensor. The method includes: in an image that is displayed on the installation assistance device and includes a crosswalk, designating a candidate position that is a candidate for an installation position of the radio-wave sensor, thereby causing the installation assistance device to display a radio-wave irradiation range of the radio-wave sensor so as to be superimposed on the image, the radio-wave irradiation range being determined based on a target position of radio-wave irradiation by the radio-wave sensor and on the designated candidate position; and instructing the installation assistance device to move the designated candidate position, thereby causing the installation assistance device to change the shape of the radio-wave irradiation range according to the instructed movement of the candidate position, with the target position being fixed. This allows the user to visually confirm the change in the shape of the radio-wave irradiation range when the candidate position is moved.

Details of Embodiment of the Present Disclosure

Hereinafter, details of an embodiment of the present disclosure will be described with reference to the drawings. At least some parts of the embodiment described below may be combined together as desired.

1. Infrastructure Radio-Wave Sensor

FIG. 1 shows a usage example of an infrastructure radio-wave sensor according to an embodiment. An infrastructure radio-wave sensor 10 according to the present embodiment is a radio-wave radar for traffic monitoring, and detects pedestrians on a crosswalk 20. The infrastructure radio-wave sensor 10 is, for example, a millimeter wave radar.

The infrastructure radio-wave sensor 10 is mounted to a structure 50 installed on a road. The structure 50 has a height of several meters, and the infrastructure radio-wave sensor 10 is installed at a height of several meters above the ground. The structure 50 includes, for example, a pole 51, and an arm 52 disposed near an upper end of the pole 51. The infrastructure radio-wave sensor 10 is mounted to the arm 52.

The infrastructure radio-wave sensor 10 emits a radio wave (millimeter wave) onto the crosswalk 20, and receives the reflected wave to detect an object (a pedestrian, a bicycle, etc.) on the crosswalk 20. More specifically, the infrastructure radio-wave sensor 10 can detect the distance from the infrastructure radio-wave sensor 10 to the object on the crosswalk 20, the speed of the object, and the horizontal angle (azimuth angle) of the position where the object is present, with respect to the radio-wave irradiation axis.

In the infrastructure radio-wave sensor 10, a detection area 30, which is a range on the road for detecting an object, is set. The detection area 30 is set as a part of a radio-wave irradiation range 40 of the infrastructure radio-wave sensor 10. That is, the radio-wave irradiation range 40 covers the detection area 30. In order for the infrastructure radio-wave sensor 10 to monitor the traffic condition of the entire crosswalk 20, it is preferable to set the detection area 30 including the entire crosswalk 20. The radio-wave irradiation range 40 is a range in which the object reflects the radio wave emitted from the infrastructure radio-wave sensor 10, and the reflected wave from the object enables the infrastructure radio-wave sensor 10 to detect the object. The radio-wave irradiation range 40 does not include a range in which the infrastructure radio-wave sensor 10 cannot detect an object even though the range can be irradiated with the radio wave. However, the radio-wave irradiation range 40 is not limited thereto, and may be the whole range that can be irradiated with the radio wave emitted from the infrastructure radio-wave sensor 10.

The radio-wave irradiation range of the infrastructure radio-wave sensor 10 as described above changes according to the position and the angle at which the sensor 10 is installed. Therefore, in order to set the detection area 30 including the entire crosswalk 20, the infrastructure radio-wave sensor 10 needs to be installed at an appropriate position and an appropriate angle. In the present embodiment, an installation assistance device assists in determination of a position and an angle at which the infrastructure radio-wave sensor 10 as described above is to be installed.

2. Configuration of Installation Assistance Device

Figure 2:
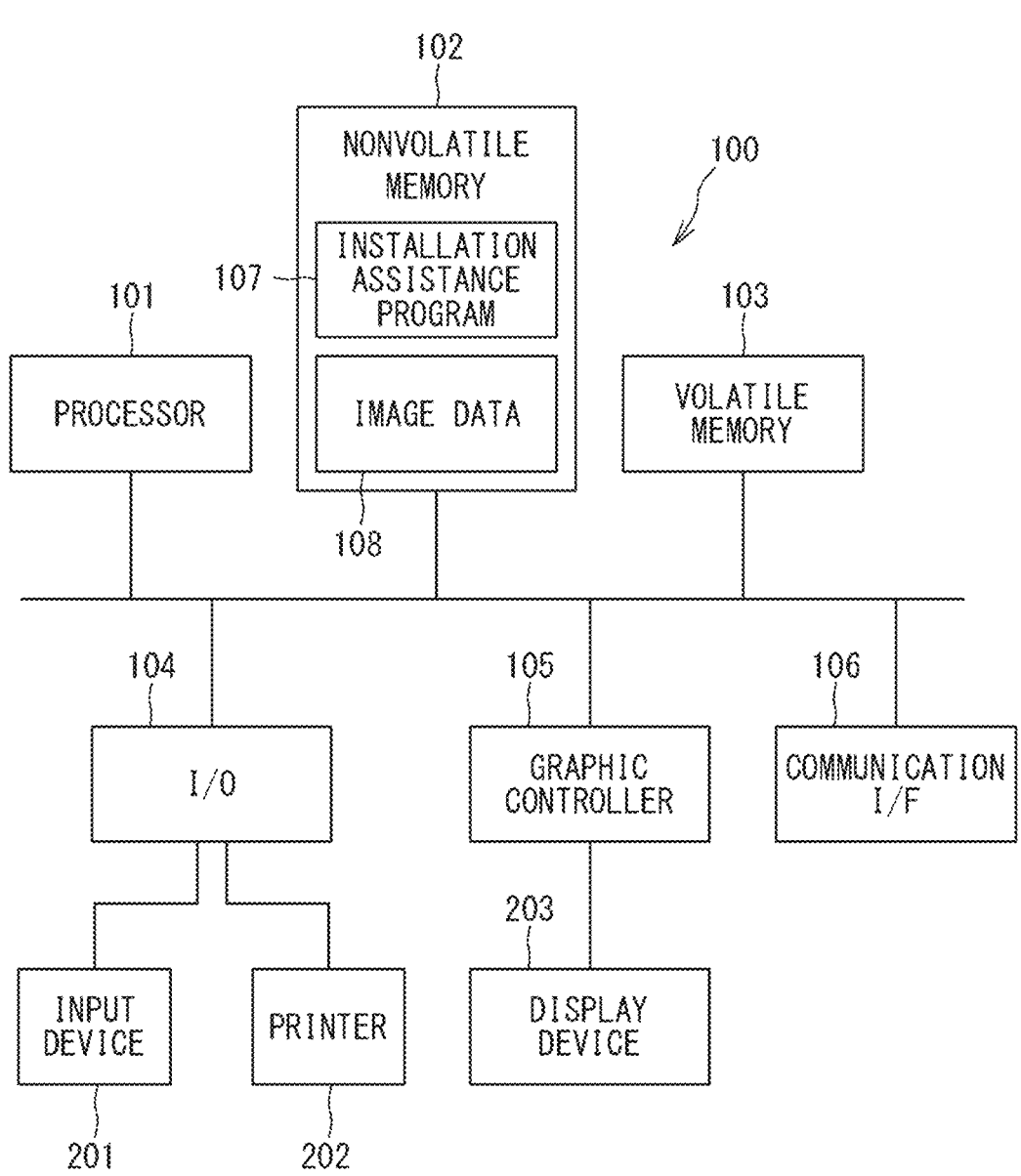
FIG. 2 is a block diagram showing an example of a hardware configuration of the installation assistance device according to the embodiment.

FIG. 2 is a block diagram showing an example of a hardware configuration of the installation assistance device according to the present embodiment. An installation assistance device 100 according to the present embodiment is used by a user who determines a position and an angle at which the infrastructure radio-wave sensor 10 is to be installed. The installation assistance device 100 includes a processor 101, a nonvolatile memory 102, a volatile memory 103, an input/output interface (I/O) 104, a graphic controller 105, and a communication interface (communication I/F) 106. The installation assistance device 100 further includes an input device 201, a printer 202, and a display device 203. At least one of the input device 201, the printer 202, and the display device 203 may be an external device connected to the installation assistance device 100.

The volatile memory 103 is, for example, a semiconductor memory such as an SRAM (Static Random Access Memory) or a DRAM (Dynamic Random Access Memory). The nonvolatile memory 102 is, for example, a flash memory, a hard disk, a ROM (Read Only Memory), or the like. The nonvolatile memory 102 has, stored therein, an installation assistance program 107 as a computer program, and data such as image data (image file) 108 used for execution of the installation assistance program 107. The installation assistance device 100 is configured to include a computer, and each of the functions of the installation assistance device 100 is exhibited when the installation assistance program 107 as the computer program stored in a storage device of the computer is executed by the processor 101. The installation assistance program 107 can be stored in a recording medium such as a flash memory, a ROM, or a CD-ROM. With the installation assistance program 107, the processor 101 assists the user to determine a position and an angle at which the infrastructure radio-wave sensor 10 is to be installed.

The processor 101 is, for example, a CPU (Central Processing Unit). However, the processor 101 is not limited to a CPU. The processor 101 may be a GPU (Graphics Processing Unit). For example, the processor 101 may be an ASIC (Application Specific Integrated Circuit), or may be a programmable logic device such as an FPGA (Field Programmable Gate Array). In this case, the ASIC or the programmable logic device is configured to be able to execute the same processing as the installation assistance program 107.

For example, the input device 201 includes a keyboard and a pointing device such as a mouse. The input device 201 may be a capacitive or pressure sensitive touchpad that is overlaid on the screen of the display device 203. The input device 201 is used for inputting data into the installation assistance device 100. The I/O 104 is connected to the input device 201 and the printer 202. The I/O 104 receives input data from the input device 201, and gives the received data to the processor 101. Furthermore, the I/O 104 outputs, to the printer 202, a print command and data required for printing which are given from the processor 101. The printer 202 performs printing according to the inputted print command and data.

The display device 203 includes, for example, a liquid crystal panel or an OEL (organic electroluminescence) panel. The display device 203 can display textual or graphic information. The graphic controller 105 is connected to the display device 203, and controls display on the display device 203. The graphic controller 105 includes, for example, a GPU and a VRAM (Video RAM). The graphic controller 105 holds, in the VRAM, data to be displayed on the display device 203, and periodically reads out video data for one frame from the VRAM to generate a video signal. The generated video signal is outputted to the display device 203, and video is displayed on the display device 203. The function of the graphic controller 105 may be included in the processor 101. A partial area of the volatile memory 103 may be used as a VRAM.

The communication I/F 106 can communicate with an external device. The communication I/F 106 can transmit, for example, information including the installation position and angle of the infrastructure radio-wave sensor 10 which are determined by using the installation assistance device 100, to a server or a terminal device.

3. Functions of Installation Assistance Device

Figure 3:
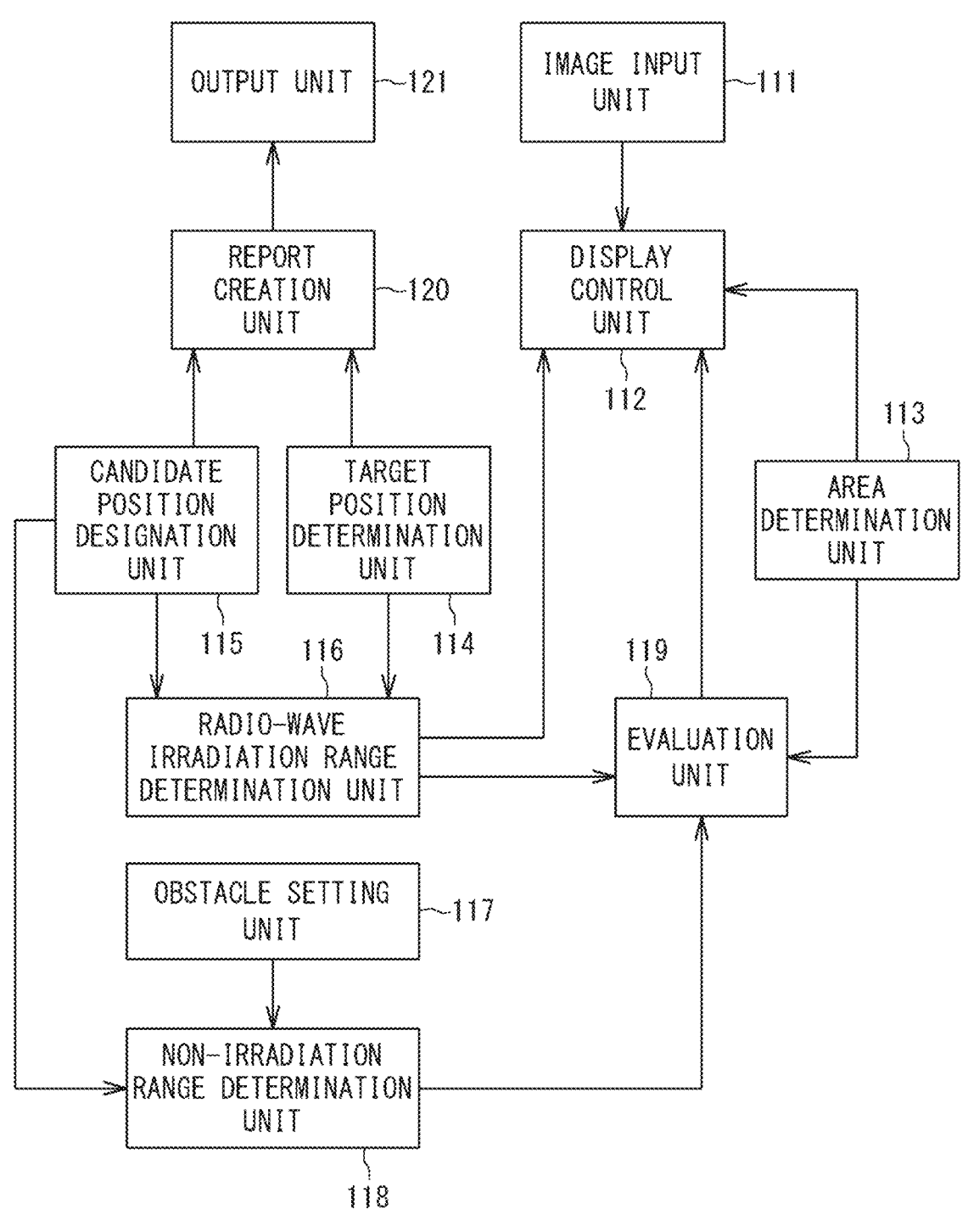
FIG. 3 is a functional block diagram showing an example of the functions of the installation assistance device according to the embodiment.

FIG. 3 is a functional block diagram showing an example of functions of the installation assistance device according to the present embodiment. The processor 101 executing the installation assistance program 107 allows the installation assistance device 100 to function as an image input unit 111, a display control unit 112, an area determination unit 113, a target position determination unit 114, a candidate position designation unit 115, a radio-wave irradiation range determination unit 116, an obstacle setting unit 117, a non-irradiation range determination unit 118, an evaluation unit 119, a report creation unit 120, and an output unit 121.

The image input unit 111, the area determination unit 113, the target position determination unit 114, the candidate position designation unit 115, the radio-wave irradiation range determination unit 116, the obstacle setting unit 117, the non-irradiation range determination unit 118, the evaluation unit 119, and the report creation unit 120 are mainly realized by the processor 101. The display control unit 112 is mainly realized by the graphic controller 105. The output unit 121 is mainly realized by the I/O 104.

The image input unit 111 receives an input of image data 108 including a crosswalk. The display control unit 112 causes the display device 203 to display an installation position determination screen including the inputted image data 108. The image data 108 is data of an image including the crosswalk. For example, the image data 108 is data of a picture of the crosswalk. However, the image data 108 is not limited to such picture data, and may be, for example, map data including the crosswalk, or drawing data of the crosswalk used for road construction.

Figure 4:
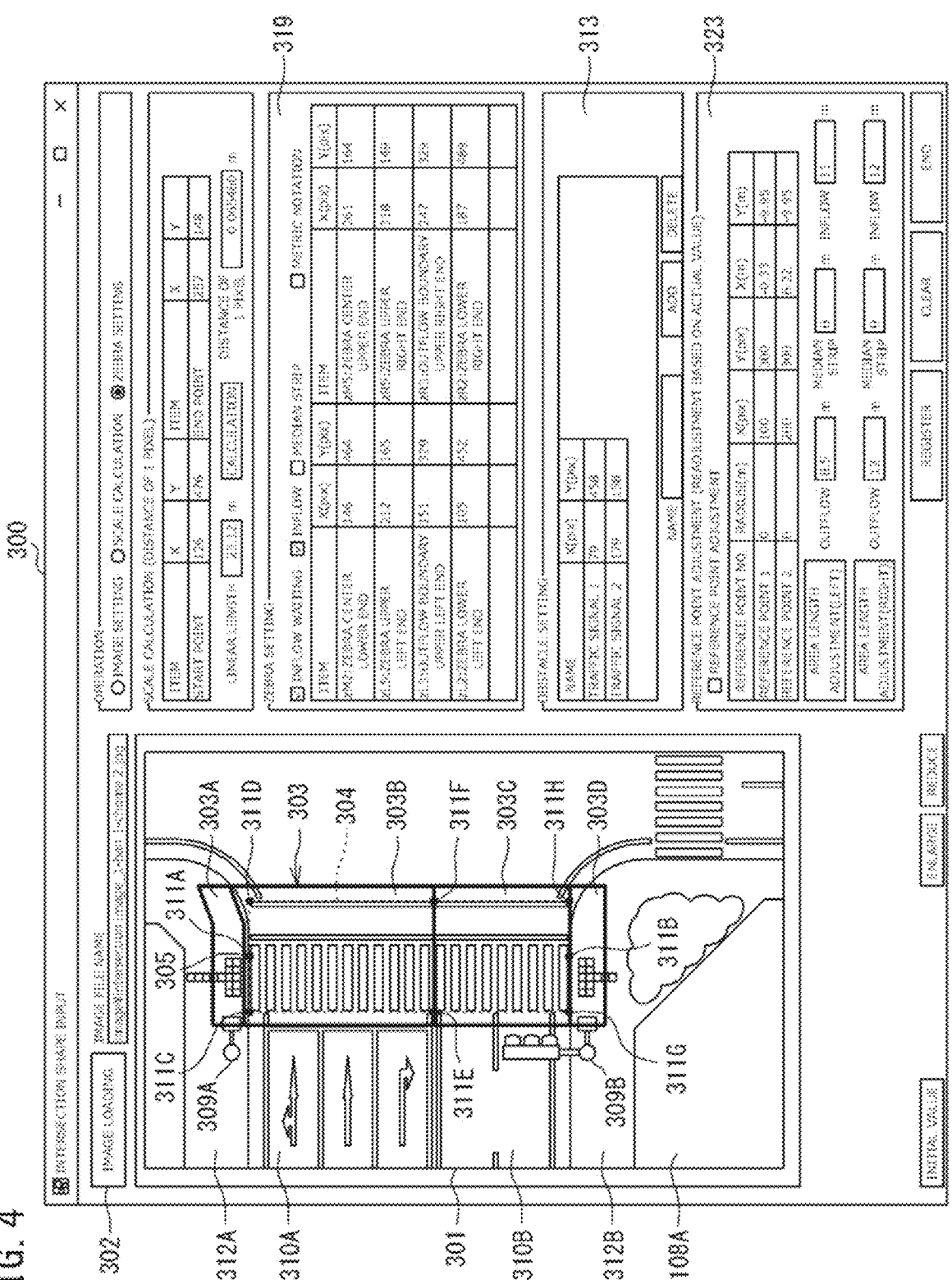
FIG. 4 shows an example of an installation position determination screen on which an image including a crosswalk is displayed.
Figure 5:
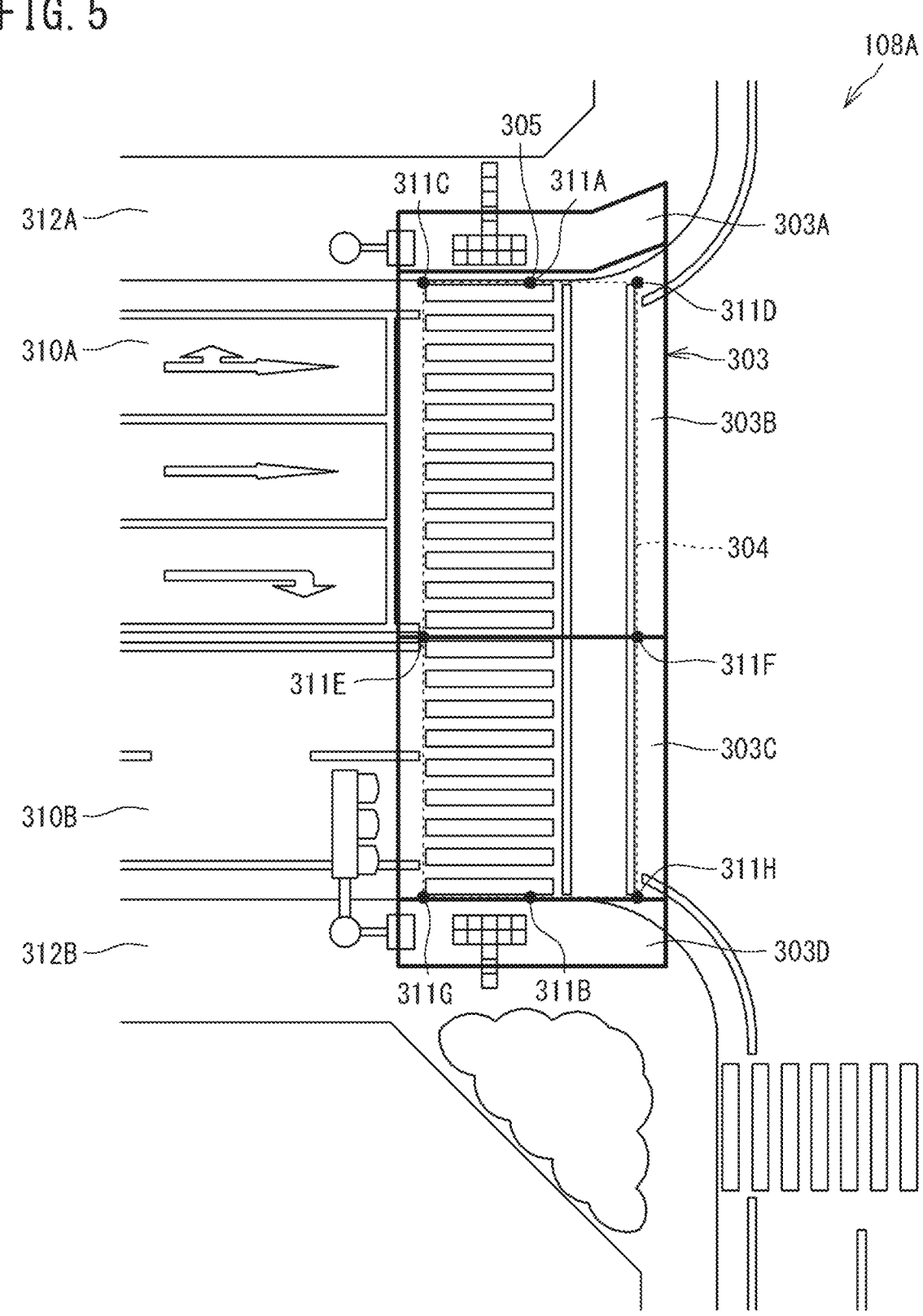
FIG. 5 is an enlarged view of the image displayed on the installation position determination screen in FIG. 4.

FIG. 4 shows an example of the installation position determination screen on which the image including the crosswalk is displayed. FIG. 5 is an enlarged view of the image displayed on the installation position determination screen in FIG. 4. An installation position determination screen 300 includes a display area 301 for an input image. In the example shown in FIG. 4, the display area 301 is an area on the left side of the installation position determination screen 300. For example, a button 302 for instructing image loading is disposed near the display area 301. The user can cause a window (not shown) for selecting the image data 108 to be displayed, by giving an operation of pressing (clicking) the button 302 to the input device 201. By selecting the image data 108 from the window, the user can designate the image data 108 to be inputted. When the image data 108 has been designated by the user, the image input unit 111 receives the input of the image data 108.

Referring back to FIG. 3, the area determination unit 113 determines a target detection area 303, based on an image 108A being displayed, i.e., an image 108A corresponding to the image data 108 designated by the user. Please refer to FIG. 5. The target detection area 303 is an area to be set as a detection area for the infrastructure radio-wave sensor 10 to detect an object. In the installation position determination screen 300, coordinates of the image 108A are defined in advance. The origin of the coordinates is, for example, a point at an upper left corner of the image 108A, and an X axis extending rightward from the origin and a Y axis extending downward from the origin are defined.

The installation position determination screen 300 includes a zebra setting section 319 for setting a crosswalk area (hereinafter referred to as "zebra area") 304 in the image 108A. An example of a crosswalk with a bicycle lane is shown in FIG. 5. In the crosswalk with such a bicycle lane, the bicycle lane is also a part of the zebra area 304. The zebra setting section 319 includes a plurality of input boxes for inputting coordinate values (X, Y) of: an upper end point in a left-right center (zebra center upper end) 311A of the crosswalk in the image 108A; a lower end point in the left-right center (zebra center lower end) 311B of the crosswalk; an upper left corner point (zebra upper left end) 311C of the crosswalk: an upper right corner point (zebra upper right end) 311D of the crosswalk; a left end point (outflow boundary upper left end) 311E at a boundary between a road on an intersection inflow side (a road where a vehicle advancing direction is an inflow direction to an intersection (hereinafter referred to as "inflow-side road")) 310A and a road on an intersection outflow side (a road where the vehicle advancing direction is an outflow direction from the intersection (hereinafter referred to as "outflow-side road")) 310B; a right end point (outflow boundary upper right end) 311F at the boundary; a lower left corner point (zebra lower left end) 311G of the crosswalk; and a lower right corner point (zebra lower right end) 311H of the crosswalk. The user can designate the zebra area 304 in the image 108A by inputting coordinate values to the input boxes in the zebra setting section 319, or by clicking and designating the above points displayed in the displayed image 108A. Hereinafter, the zebra center upper end 311A, the zebra center lower end 311B, the zebra upper left end 311C, the zebra upper right end 311D, the outflow boundary upper left end 311E, the outflow boundary upper right end 311F, the zebra lower left end 311G, and the zebra lower right end 311H are collectively referred to as "area definition point 311". The installation assistance device 100 may detect the area definition point 311 by analyzing the image 108A.

The area determination unit 113 determines the zebra area 304, based on the area definition points 311A to 311H. The area determination unit 113 further determines a target detection area 303, based on the zebra area 304. The area definition points 311A to 311H are points for defining the target detection area 303.

The target detection area 303 is an area larger than the zebra area 304. Specifically, the target detection area 303 is an area obtained by expanding the zebra area 304 at both the left and right sides, and expanding the zebra area 304 at both the upper and lower sides. The portions expanded from both the left and right sides of the zebra area 304 are margins for detecting a pedestrian who is walking slightly outside the crosswalk, or a bicycle (hereinafter, "pedestrian" includes "bicycle"). The portions expanded from both the upper and lower sides of the zebra area 304 are waiting areas for a pedestrian who is waiting for a green light on sidewalks 312A, 312B.

For example, the nonvolatile memory 102 of the installation assistance device 100 has, stored therein, a set value of the size of each margin, and a set value of the size of each waiting area. An example of the set value of the size of the margin is the length of the margin in the X direction from the left and right ends of the zebra area 304. An example of the set value of the size of the waiting area is the length of the waiting area in the Y direction from the upper and lower ends of the zebra area 304. The area determination unit 113 can determine the target detection area 303 by expanding the zebra area 304 by the set value of the size of the margin in the left-right direction (X direction) and expanding the zebra area 304 by the set value of the size of the waiting area in the up-down direction (Y direction).

The target detection area 303 is divided into a plurality of partial areas. In a specific example, the target detection area 303 is divided into an inflow-side waiting area 303A, an inflow-side zebra area 303B, an outflow-side zebra area 303C, and an outflow-side waiting area 303D. The inflow-side waiting area 303A is a part of the sidewalk 312A abutting an inflow-side road 310A, and is an area for a pedestrian who is waiting for a green light. The inflow-side zebra area 303B is a crosswalk area corresponding to the inflow-side road 310A. The outflow-side zebra area 303C is a crosswalk area corresponding to the outflow-side road 310B. The outflow-side waiting area 303D is a part of the sidewalk 312B abutting the outflow-side road 310B, and is an area for a pedestrian who is waiting for a green signal. The area determination unit 113 can determine each of the inflow-side waiting area 303A, the inflow-side zebra area 303B, the outflow-side zebra area 303C, and the outflow-side waiting area 303D.

The display control unit 112 causes the display device 203 to display the inflow-side waiting area 303A, the inflow-side zebra area 303B, the outflow-side zebra area 303C, and the outflow-side waiting area 303D so as to be superimposed on the image 108A. In a specific example, the display control unit 112 displays each of the inflow-side waiting area 303A, the inflow-side zebra area 303B, the outflow-side zebra area 303C, and the outflow-side waiting area 303D, in a transparent color. This prevents the image of the crosswalk included in the image 108A from being hidden by the inflow-side waiting area 303A, the inflow-side zebra area 303B, the outflow-side zebra area 303C, and the outflow-side waiting area 303D, whereby the user can visually recognize the image of the crosswalk as well as the inflow-side waiting area 303A, the inflow-side zebra area 303B, the outflow-side zebra area 303C, and the outflow-side waiting area 303D. Therefore, the user can easily recognize the positional relationship between the crosswalk, and each of the inflow-side waiting area 303A, the inflow-side zebra area 303B, the outflow-side zebra area 303C, and the outflow-side waiting area 303D.

The display control unit 112 can display the inflow-side waiting area 303A, the inflow-side zebra area 303B, the outflow-side zebra area 303C, and the outflow-side waiting area 303D, in different colors. Thus, the areas 303A to 303D displayed in different colors enable the user to easily distinguish the inflow-side waiting area 303A, the inflow-side zebra area 303B, the outflow-side zebra area 303C, and the outflow-side waiting area 303D from each other.

Referring back to FIG. 3, the target position determination unit 114 determines, in the image 108A, a target position of radio-wave irradiation by the infrastructure radio-wave sensor 10. Please refer to FIG. 5. For example, the target position determination unit 114 determines, as a default target position 305, a center point on an upper side of the inflow-side zebra area 303B. For example, the user can designate, as a target position, any point in the image 108A. The target position determination unit 114 can change the target position 305 to the point designated by the user.

Referring back to FIG. 3, the candidate position designation unit 115 receives, from the user, designation of a candidate position that is a candidate for the installation position of the infrastructure radio-wave sensor 10 in the image 108A. In the example shown in FIG. 5, it is assumed that a position where the infrastructure radio-wave sensor 10 is to be installed is determined to be on the sidewalk 312B abutting the outflow-side road 310B. The user can designate a candidate position by, for example, clicking a desired point in the image 108A while operating the input device 201.

Referring back to FIG. 3, the radio-wave irradiation range determination unit 116 determines a radio-wave irradiation range of the infrastructure radio-wave sensor 10, based on the target position 305 determined by the target position determination unit 114 and the candidate position received by the candidate position designation unit 115. The installation assistance device 100 has information for determining a radio-wave irradiation range (e.g., a beam width from a radio wave transmitting surface, and a radio-wave reachable distance). Using the above information, the radio-wave irradiation range determination unit 116 determines a radio-wave irradiation range that is a range having a beam width centered around a straight line connecting the candidate position and the target position 305, and that is a range from the candidate position to the radio-wave reachable distance.

Figure 6:
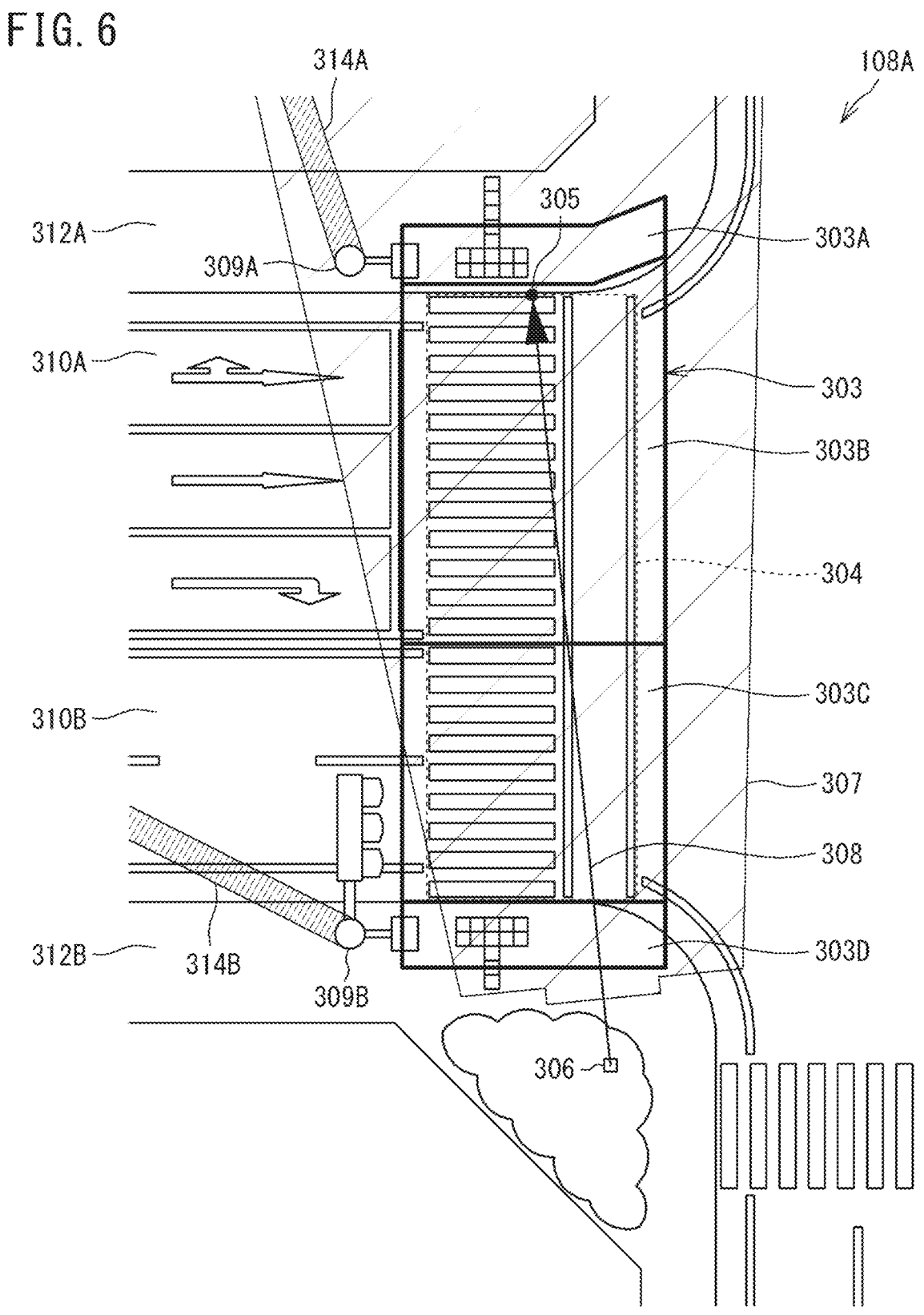
FIG. 6 shows an example of an image including a crosswalk, on which a radio-wave irradiation range is superimposed.

The display control unit 112 causes the display device 203 to display the radio-wave irradiation range determined by the radio-wave irradiation range determination unit 116 so as to be superimposed on the image 108A. FIG. 6 shows an example of the image including the crosswalk, on which the radio-wave irradiation range is superimposed. For example, as shown in FIG. 6, the radio-wave irradiation range 307 is displayed in a transparent color. This prevents the image of the crosswalk and the target detection area 303 included in the image 108A from being hidden by the radio-wave irradiation range 307, and allows the user to visually recognize the radio-wave irradiation range 307, the image of the crosswalk, and the target detection area 303. Therefore, the user can easily recognize the positional relationship between the radio-wave irradiation range 307, the crosswalk, and each of the inflow-side waiting area 303A, the inflow-side zebra area 303B, the outflow-side zebra area 303C, and the outflow-side waiting area 303D. For example, the user can easily recognize whether the radio-wave irradiation range 307 is superimposed over the whole target detection area 303. If a part of the target detection area 303 is outside the radio-wave irradiation range 307, the user can easily recognize which part of the target detection area 303 is outside the radio-wave irradiation range 307 and to what extent.

The display control unit 112 can make the display color of the radio-wave irradiation range 307 different from the display colors of the inflow-side waiting area 303A, the inflow-side zebra area 303B, the outflow-side zebra area 303C, and the outflow-side waiting area 303D. This allows the user to easily distinguish the radio-wave irradiation range 307 from each of the inflow-side waiting area 303A, the inflow-side zebra area 303B, the outflow-side zebra area 303C, and the outflow-side waiting area 303D.

The display control unit 112 causes the display device 203 to display a straight line or a line segment that connects the target position 305 and the candidate position 306. For example, the straight line or the line segment is an arrow 308 directed from the candidate position 306 to the target position 305. The display control unit 112 causes the display device 203 to display the arrow 308 so as to be superimposed on the image 108A, the target detection area 303, and the radio-wave irradiation range 307. This allows the user to easily recognize the radio wave irradiation direction.

Referring back to FIG. 3, the obstacle setting unit 117 sets an obstacle that blocks the radio wave, in association with the image 108A. Please refer to FIG. 6. Traffic signal poles 309A, 309B are examples of the obstacle that blocks the radio wave. The user inputs the coordinates of the obstacle in the image 108A to the installation assistance device 100. In the example shown in FIG. 4, the installation position determination screen 300 includes an obstacle setting section 313 for setting the positions of the obstacles in the image 108A. The obstacle setting section 313 includes a plurality of input boxes for inputting the coordinate values of definition points of the traffic signal poles 309A, 309B being obstacles in the image 108A. The user can set the obstacles in the image 108A by inputting the coordinate values to the input boxes in the obstacle setting section 313, or by clicking and designating the definition points of the obstacles in the displayed image 108A.

Referring back to FIG. 3, the non-irradiation range determination unit 118 determines a non-irradiation range in which the radio wave emitted from the infrastructure radio-wave sensor 10 is blocked by the obstacle (traffic signal poles 309A, 309B). The display control unit 112 causes the display device 203 to display the non-irradiation range determined by the non-irradiation range determination unit 118 so as to be superimposed on the image 108A. Please refer to FIG. 6. The non-irradiation range is formed on the opposite side of the candidate position 306 with respect to the obstacle. A non-irradiation range 314A is formed on the opposite side of the candidate position 306 with respect to the traffic signal pole 309A. A non-irradiation range 314B is formed on the opposite side of the candidate position 306 with respect to the traffic signal pole 309B. The non-irradiation range 314A is an area extending in the direction opposite to the candidate position 306 from the traffic signal pole 309A, and has a width according to the thickness of the traffic signal pole 309A. The non-irradiation range 314B is an area extending in the direction opposite to the candidate position 306 from the traffic signal pole 309B, and has a width according to the thickness of the traffic signal pole 309B.

The display control unit 112 can make the display color of the non-irradiation ranges 314A, 314B different from the display colors of the inflow-side waiting area 303A, the inflow-side zebra area 303B, the outflow-side zebra area 303C, the outflow-side waiting area 303D, and the radio-wave irradiation range 307. This allows the user to easily distinguish the non-irradiation ranges 314A, 314B from each of the inflow-side waiting area 303A, the inflow-side zebra area 303B, the outflow-side zebra area 303C, the outflow-side waiting area 303D, and the radio-wave irradiation range 307.

Referring back to FIG. 3, the evaluation unit 119 evaluates the candidate position 306 designated by the user, based on the radio-wave irradiation range 307 and the target detection area 303 in the image 108A. In a specific example, the evaluation unit 119 calculates a coverage ratio that is a ratio of a part, of the target detection area 303, overlapping the radio-wave irradiation range 307. The evaluation unit 119 evaluates the candidate position 306, based on the calculated coverage ratio.

The evaluation unit 119 can determine the rank of the candidate position 306, based on a comparison of the coverage ratio with a threshold value. In a further specific example, the evaluation unit 119 calculates a coverage ratio for each of the inflow-side waiting area 303A, the inflow-side zebra area 303B, the outflow-side zebra area 303C, and the outflow-side waiting area 303D which are included in the target detection area 303. The evaluation unit 119 determines the rank of the candidate position 306, based on the coverage ratio of each of the inflow-side waiting area 303A, the inflow-side zebra area 303B, the outflow-side zebra area 303C, and the outflow-side waiting area 303D.

Hereinafter, the inflow-side waiting area 303A, the inflow-side zebra area 303B, the outflow-side zebra area 303C, and the outflow-side waiting area 303D are collectively referred to as "partial area". The evaluation unit 119 uses, for example, a first threshold value for a partial area. The evaluation unit 119 calculates, for each partial area, a coverage ratio (hereinafter referred to as "partial coverage ratio") that is a ratio of a part, of the partial area, overlapping the radio-wave irradiation range 307. The evaluation unit 119 compares each partial coverage ratio with the first threshold value, and determines whether or not the partial coverage ratio is equal to or greater than the first threshold value. The evaluation unit 119 can determine the rank of the candidate position 306 according to whether or not a partial area whose partial coverage ratio is less than the first threshold value is present.

The evaluation unit 119 may further use a second threshold value for a target detection area. For example, the evaluation unit 119 calculates a coverage ratio (hereinafter referred to as "whole coverage ratio") that is a ratio of a part, of the target detection area, overlapping the radio-wave irradiation range 307. The evaluation unit 119 compares the whole coverage ratio with the second threshold value, and determines whether or not the whole coverage ratio is equal to or greater than the second threshold value. The evaluation unit 119 can determine the rank of the candidate position 306 according to whether or not the whole coverage ratio is less than the second threshold value.

The evaluation unit 119 can evaluate the candidate position 306, further based on the non-irradiation ranges 314A, 314B. For example, in calculating the partial coverage ratio, the evaluation unit 119 can exclude parts where the partial area overlaps the non-irradiation ranges 314A, 314B from a part where the partial area overlaps the radio-wave irradiation range 307. More specifically, in the case where the non-irradiation ranges 314A, 314B overlap the radio-wave irradiation range 307, the evaluation unit 119 can exclude parts where the partial area overlaps the non-irradiation ranges 314A, 314B from a part where the partial area overlaps the radio-wave irradiation range 307. For example, in calculating the whole coverage ratio, the evaluation unit 119 can exclude parts where the non-irradiation ranges 314A, 314B overlap the target detection area 303 from a part where the target detection area 303 overlaps the radio-wave irradiation range 307. More specifically, in the case where the non-irradiation ranges 314A, 314B overlap the radio-wave irradiation range 307, the evaluation unit 119 can exclude parts where the non-irradiation ranges 314A, 314B overlap the target detection area 303 from a part where the target detection area 303 overlaps the radio-wave irradiation range 307.

The evaluation unit 119 can determine the rank of the candidate position 306, further based on the positional relationship between the candidate position 306 and the target detection area 303. For example, a recommended range, a semi-recommended range, and a non-recommended range are defined based on the target detection area 303 and the zebra area 304. The evaluation unit 119 can determine the rank of the candidate position 306 depending on in which of the recommended range, the semi-recommended range, and the non-recommended range, the candidate position 306 is present.

FIG. 7A to FIG. 7E illustrate examples of ranks. In the examples shown in FIG. 7A to FIG. 7E, the evaluation unit 119 assigns the candidate position 306 to any of five ranks A to E.

It is supposed that the smaller the angle formed by the radio-wave irradiation direction of the infrastructure radio-wave sensor 10 with respect to the advancing direction of the pedestrian on the crosswalk, i.e., the crosswalk longitudinal direction (Y-axis direction in FIG. 3), is, the more satisfactorily the detection accuracy can be achieved. Therefore, in the sidewalk where the infrastructure radio-wave sensor 10 is to be installed (the sidewalk 312B abutting the outflow-side road 310B in FIG. 5), an area obtained by extending the zebra area 304 in the longitudinal direction is set as a recommended range 315A in which installation of the infra-structure radio-wave sensor 10 is recommended. In the sidewalk where the infrastructure radio-wave sensor 10 is to be installed, an area, which is obtained by extending in the longitudinal direction an area that is inside in the width direction of the target detection area 303 and that is outside in the width direction of the zebra area 304 (the margin area expanded in the left-right direction from the zebra area 304), is set as a semi-recommended range 315B. The semi-recommended range 315B is a range in which installation of the infrastructure radio-wave sensor 10 is recommended next to the recommended range 315A. An area other than the recommended range 315A and the semi-recommended range 315B is set as a non-recommended range 315C. The non-recommended range 315C is a range in which installation of the infrastructure radio-wave sensor 10 is not recommended.

Figure 7A:
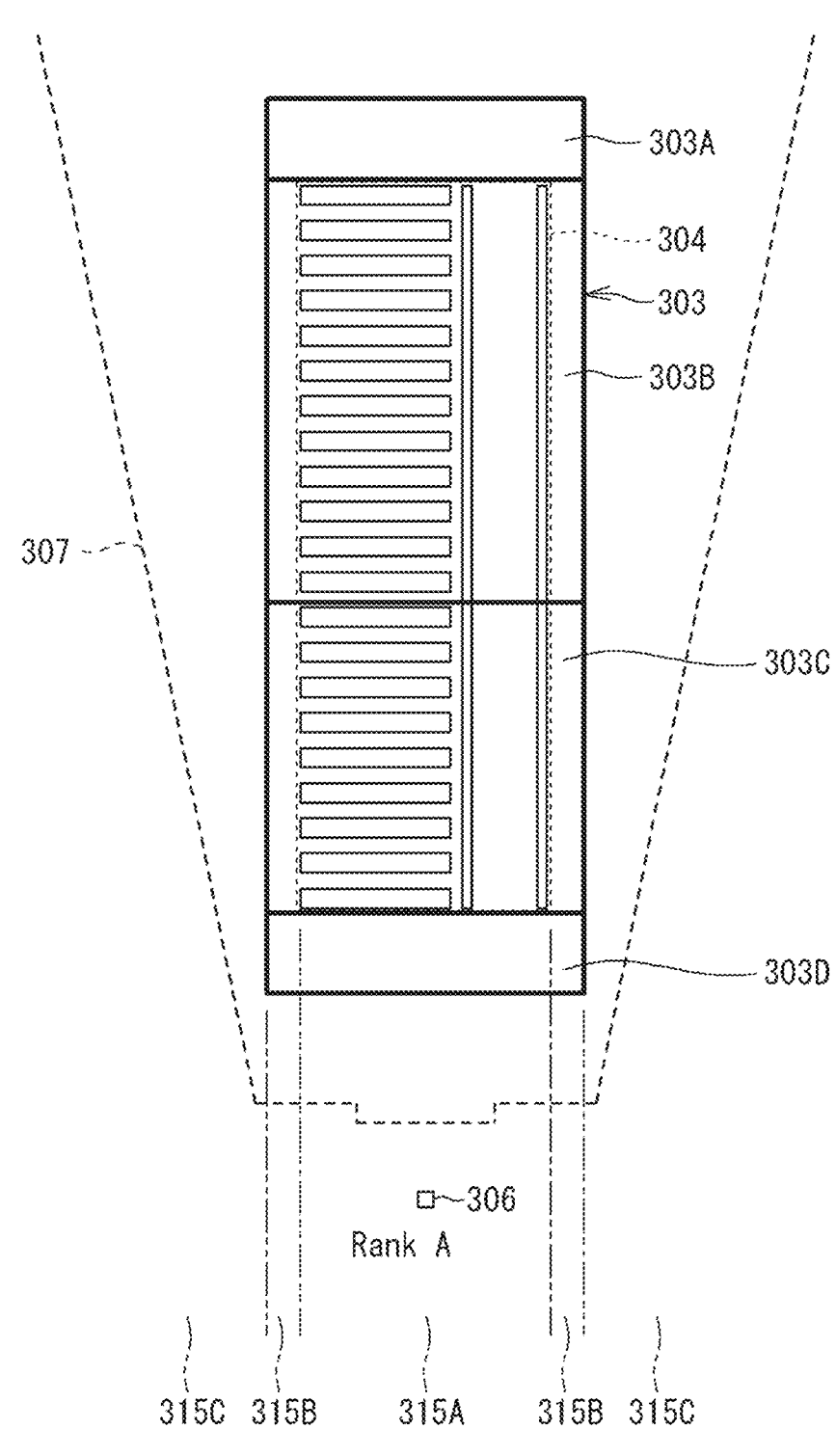
FIG. 7A illustrates an example of rank A.

For example, when the partial coverage ratios of all the partial areas are equal to or greater than the first threshold value, if the candidate position 306 is within the recommended range 315A, the candidate position 306 is determined to be rank A that is the highest rank (FIG. 7A).

Figure 7B:
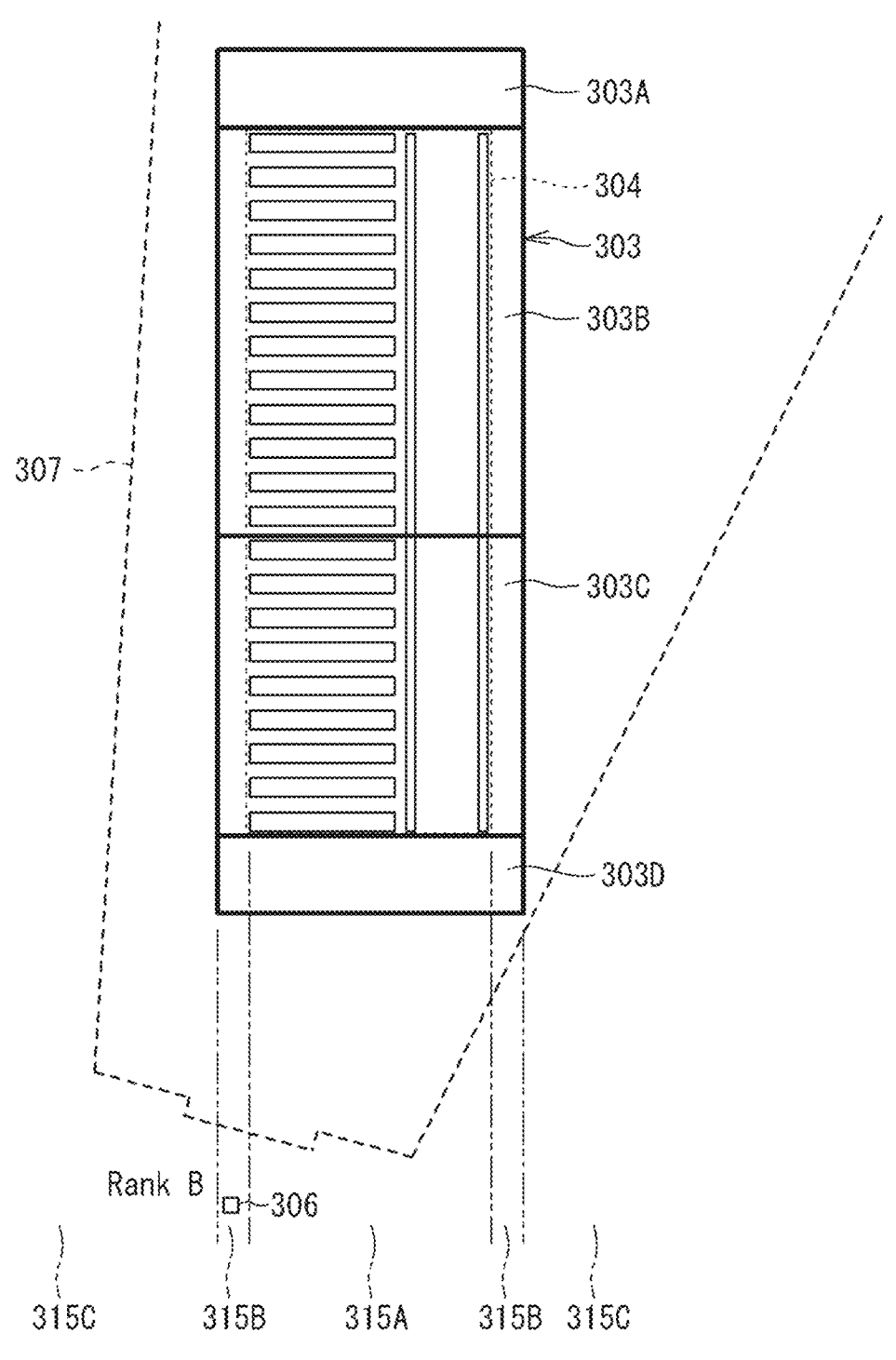
FIG. 7B illustrates an example of rank B.

For example, when the partial coverage ratios of all the partial areas are equal to or greater than the first threshold value, if the candidate position 306 is within the semi-recommended range 315B, the candidate position 306 is determined to be rank B that is the second rank (FIG. 7B).

Figure 7C:
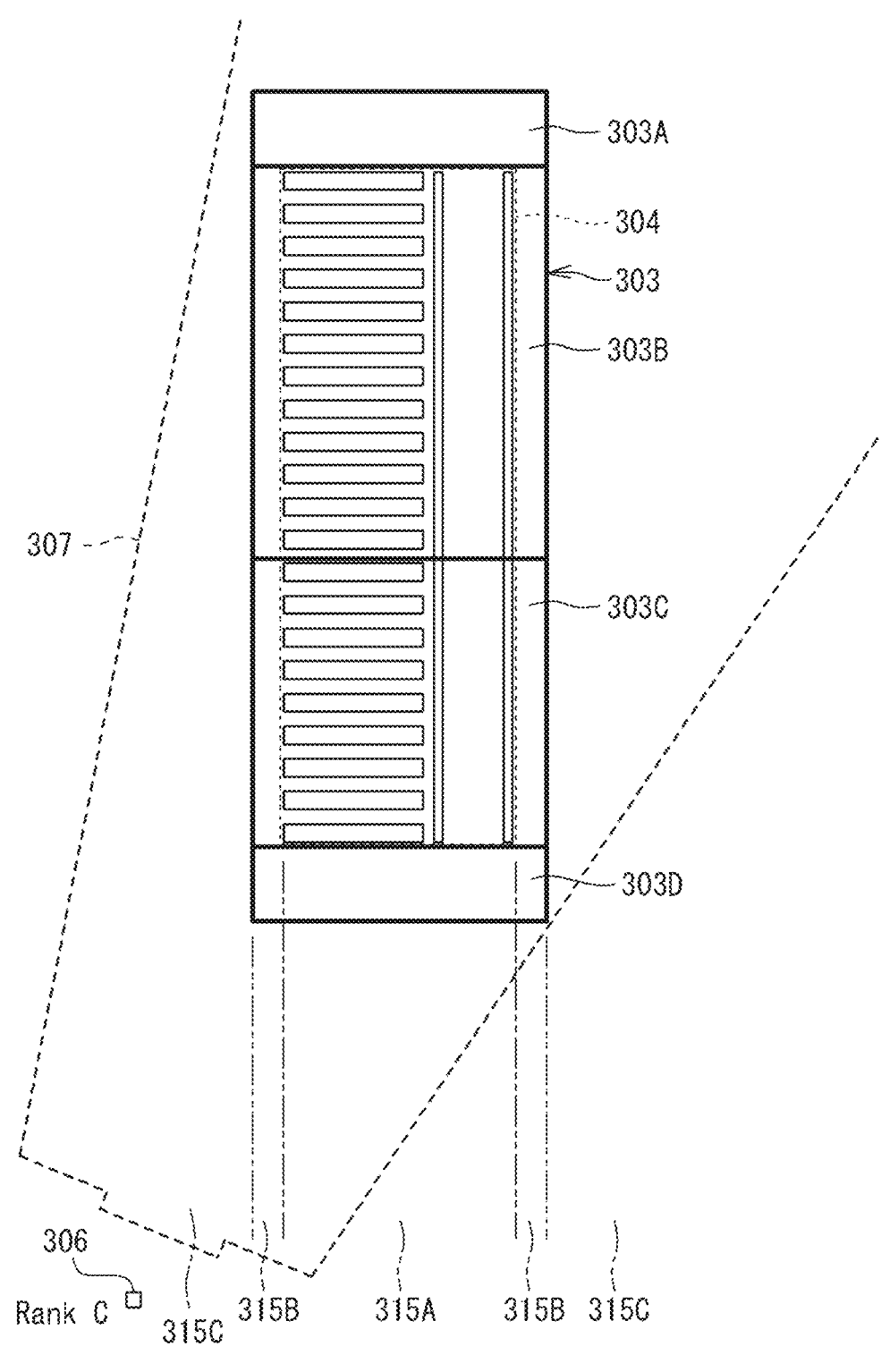
FIG. 7C illustrates an example of rank C.

For example, when the partial coverage ratios of all the partial areas are equal to or greater than the first threshold value, if the candidate position 306 is within the non-recommended range 315C, the candidate position 306 is determined to be rank C that is the third rank (FIG. 7C).

Figure 7D:
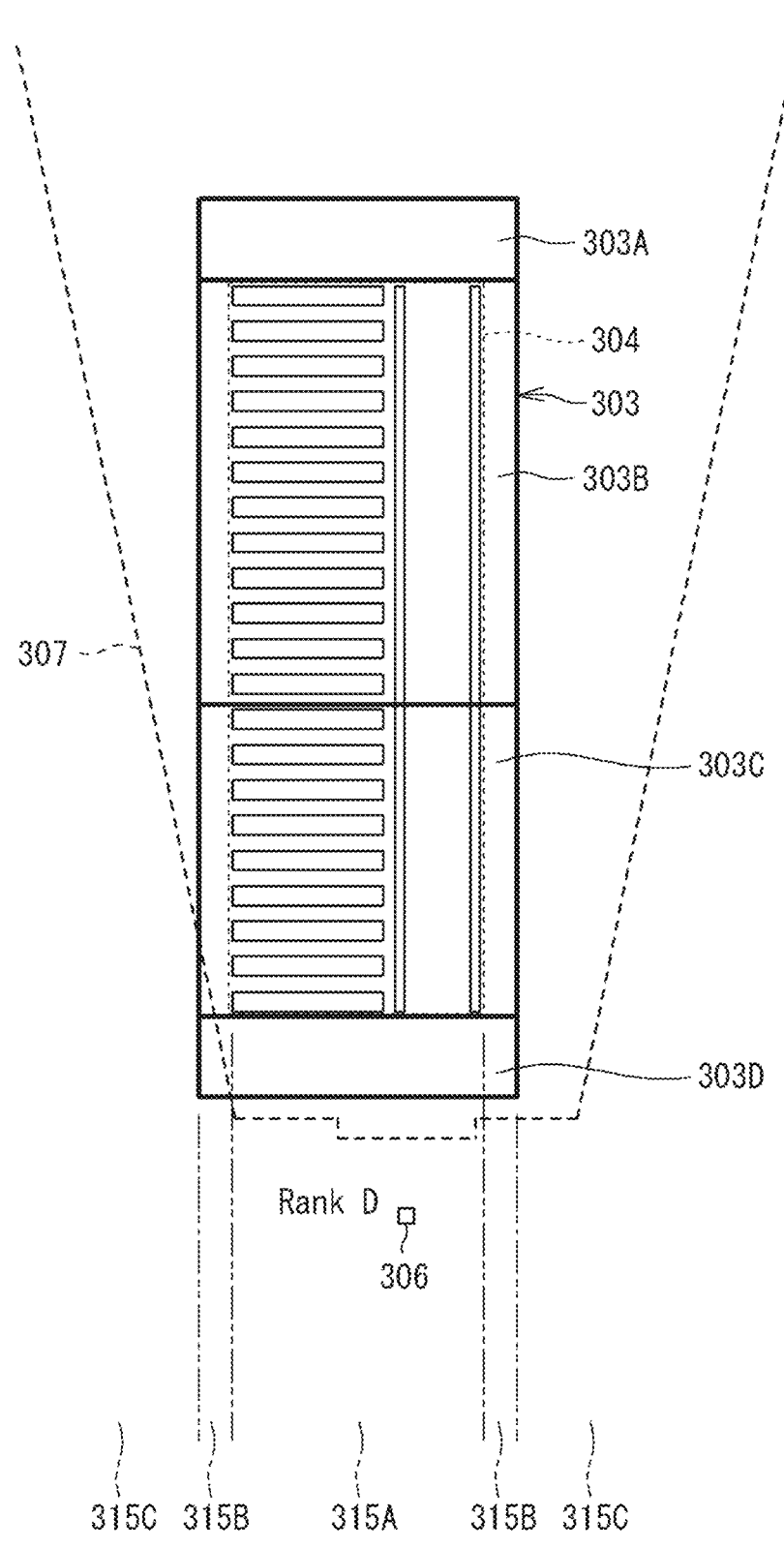
FIG. 7D illustrates an example of rank D.

For example, when the partial coverage ratio of at least one partial area is less than the first threshold value and the whole coverage ratio is equal to or greater than the second threshold value, the candidate position 306 is determined to be rank D that is the fourth rank (FIG. 7D).

Figure 7E:
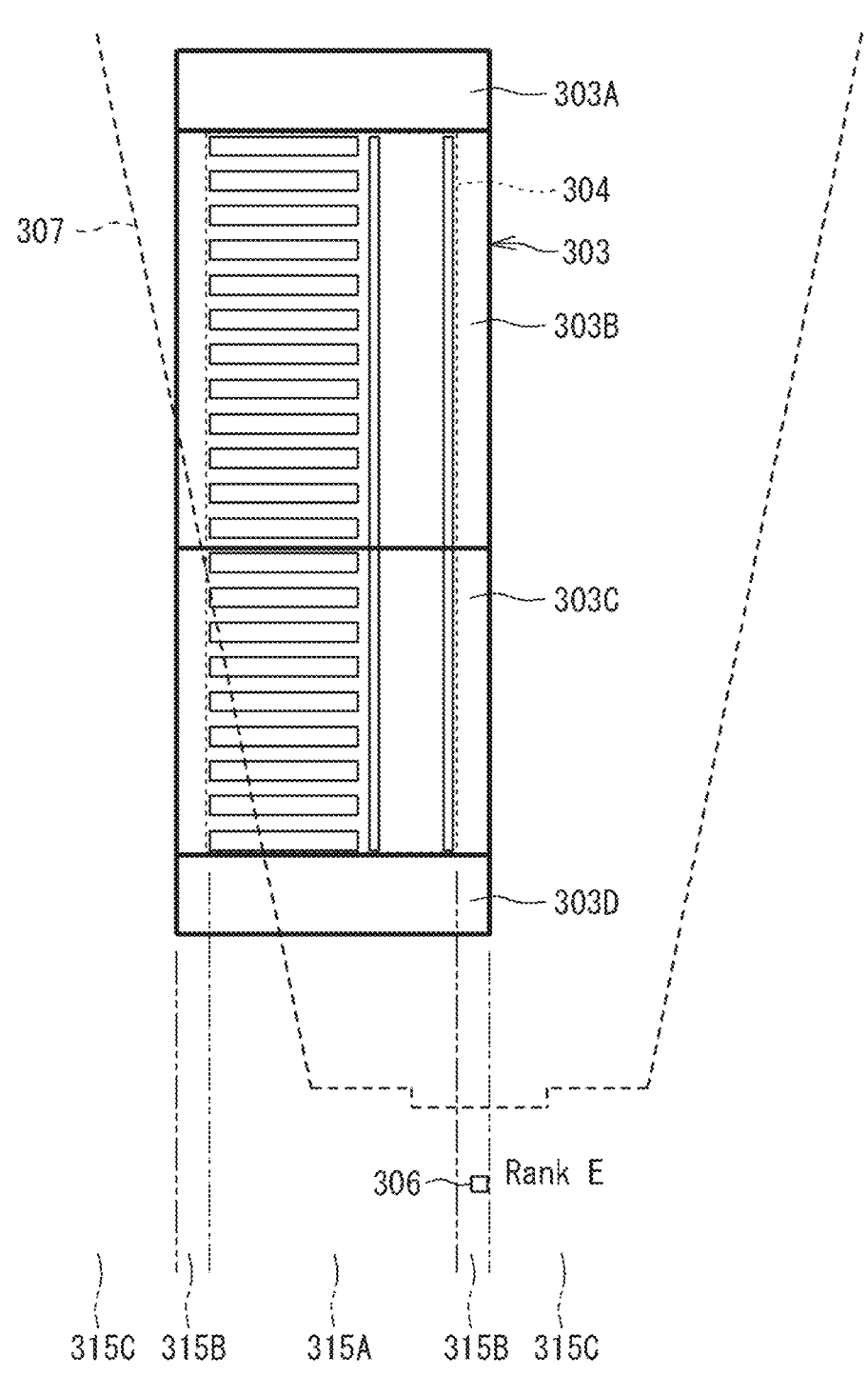
FIG. 7E illustrates an example of rank E.

For example, when the partial coverage ratio of at least one partial area is less than the first threshold value and the whole coverage ratio is less than the second threshold value, the candidate position 306 is determined to be rank E that is the lowest rank (FIG. 7E).

Referring back to FIG. 3, the display control unit 112 causes the display device 203 to display a mark indicating an evaluation result of the candidate position 306 as an installation position of the infrastructure radio-wave sensor 10, on the corresponding candidate position in the image 108A. For example, a mark that differs for each rank is displayed on the candidate position 306. In a specific example, the color of the mark differs for each rank. For example, the color of the mark of rank A is blue, the color of the mark of rank B is green, the color of the mark of rank C is yellow, the color of the mark of rank D is orange, and the color of the mark of rank E is red. The shape of the mark may differ for each rank.

Figure 8:
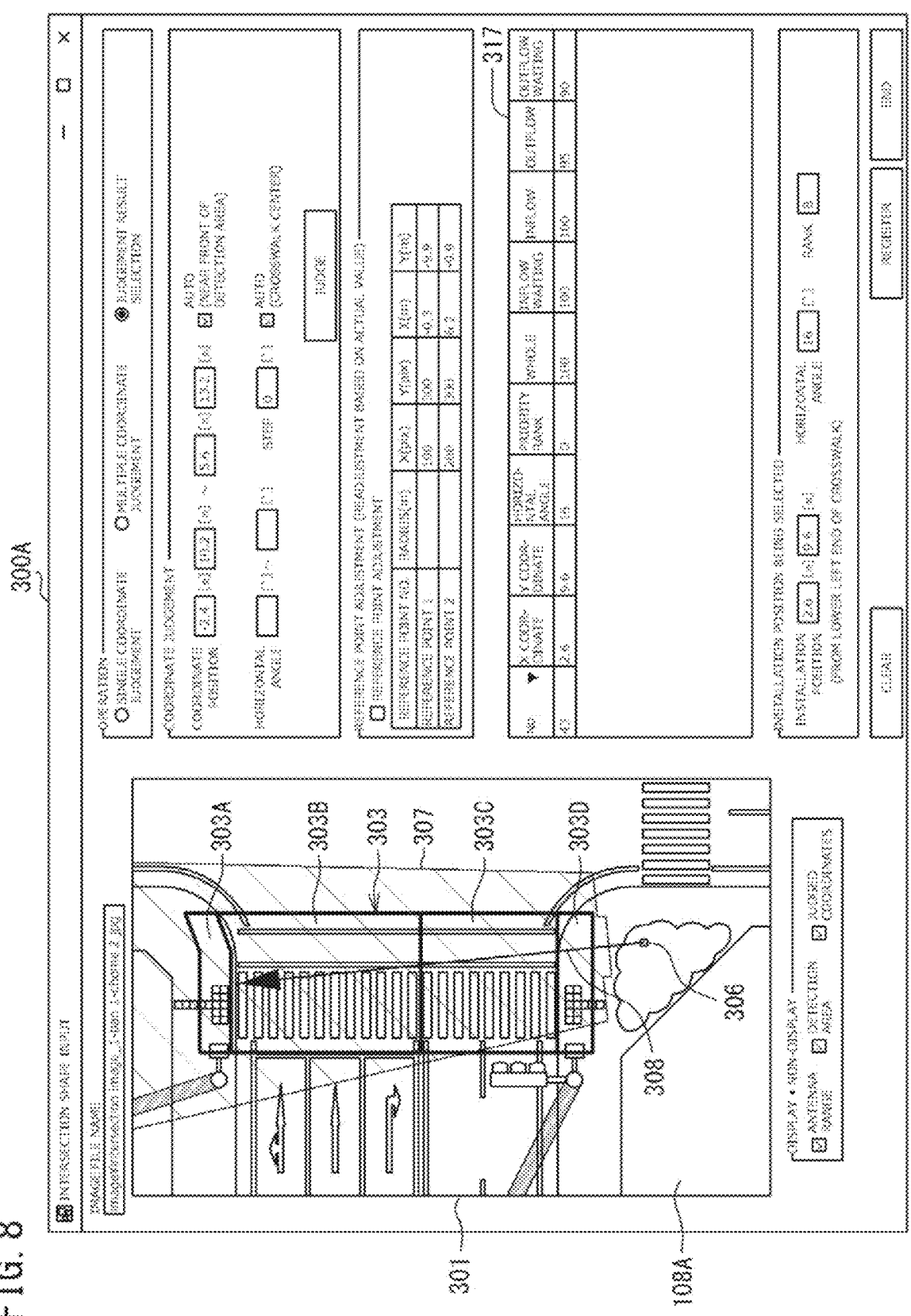
FIG. 8 shows an example of an installation position determination screen on which an evaluation result of one candidate position is displayed.

The display control unit 112 causes the display device 203 to display the evaluation result of the candidate position 306 on the installation position determination screen. FIG. 8 shows an example of the installation position determination screen on which the evaluation result of one candidate position is displayed. Upon acquiring the evaluation result of the candidate position by the evaluation unit 119, the display control unit 112 causes the display screen to transition from the installation position determination screen 300 to a screen 300A including an evaluation result display section 317. The evaluation result display section 317 includes numerical values of: coordinates (X coordinate, Y coordinate) of the candidate position; a horizontal angle (an angle formed by the radio-wave irradiation direction with respect to the longitudinal direction of the zebra area 304); a rank ("priority rank" in FIG. 8); a whole coverage ratio ("whole" in FIG. 8); a partial coverage ratio in the inflow-side waiting area 303A ("inflow waiting" in FIG. 8); a partial coverage ratio in the inflow-side zebra area 303B ("inflow" in FIG. 8): a partial coverage ratio in the outflow-side zebra area 303C ("outflow" in FIG. 8); and a partial coverage ratio in the outflow-side waiting area 303D ("outflow waiting" in FIG. 8).

Referring back to FIG. 3, the candidate position designation unit 115 receives a continuous change in the coordinates of the candidate position 306 designated by the user through the input device 201, as an instruction to move the candidate position 306. According to the movement of the candidate position 306 instructed by the user, the display control unit 112 changes the shape of the radio-wave irradiation range 307 with the target position 305 being fixed. More specifically, according to the continuous change in the designated coordinates, the display control unit 112 changes the shape of the radio-wave irradiation range 307 in real time.

According to the movement of the candidate position 306 instructed by the user, the display control unit 112 changes the shapes of the non-irradiation ranges 314A, 314B. More specifically, according to the continuous change in the designated coordinates, the display control unit 112 changes the shapes of the non-irradiation ranges 314A, 314B in real time.

Figure 9:
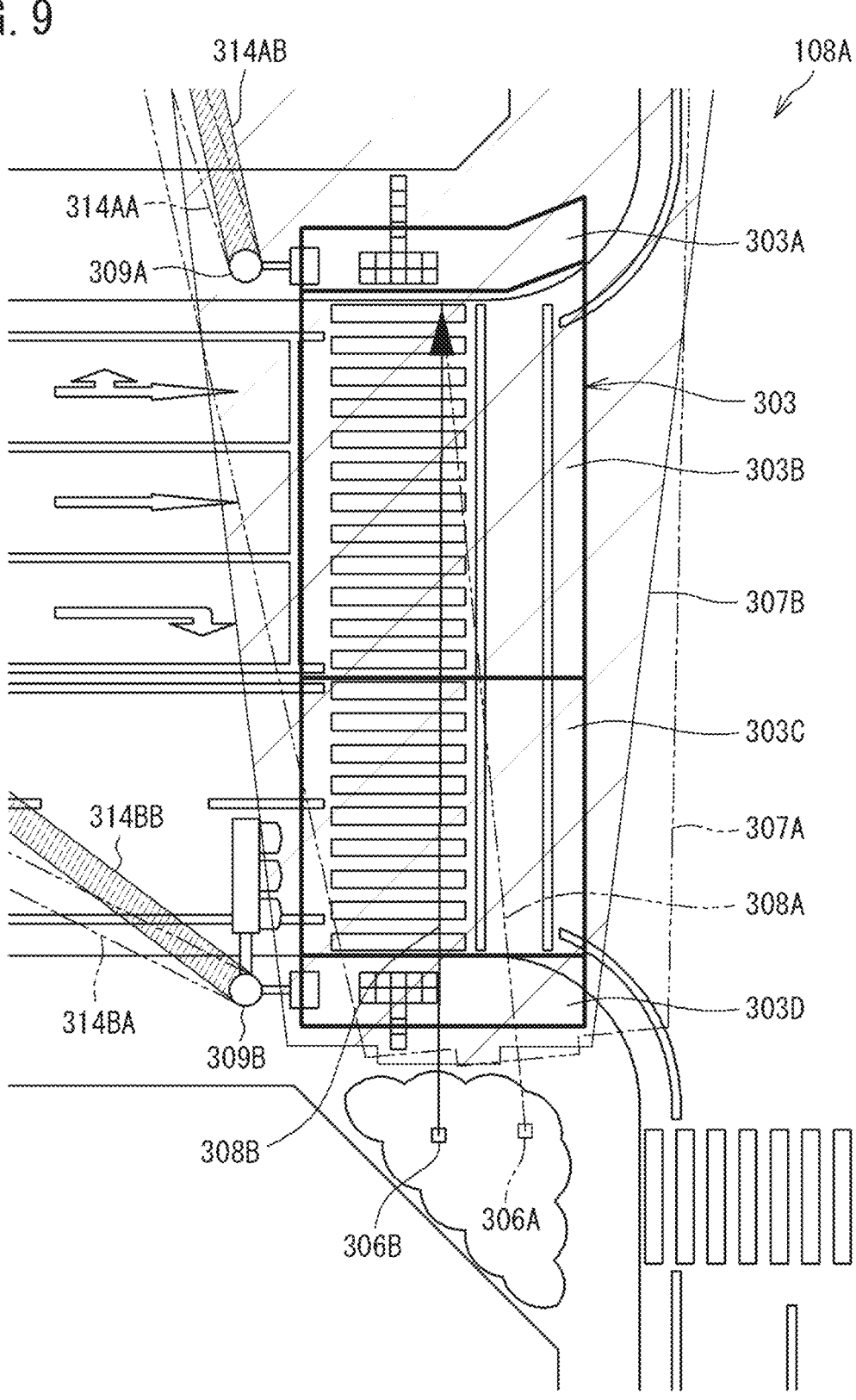
FIG. 9 shows an example of transition of a radio-wave irradiation range according to a continuous change in coordinates of a candidate position.

FIG. 9 shows an example of transition of the radio-wave irradiation range according to the continuous change in the coordinates of the candidate position. The user can continuously change the coordinates of the candidate position 306 by, for example, dragging and dropping while operating the input device 201. The candidate position designation unit 115 receives such a movement instruction regarding the candidate position 306, performed by the user. The radio-wave irradiation range determination unit 116 determines, for each candidate position 306 being changed, the radio-wave irradiation range 307 with the target position 305 being fixed. The display control unit 112 displays, in real time, the radio-wave irradiation range 307 determined by the radio-wave irradiation range determination unit 116.

Movement from the candidate position 306A to the candidate position 306B causes transition from the radio-wave irradiation range 307A to the radio-wave irradiation range 307B. Furthermore, according to the change in the coordinates of the candidate position 306, the arrow 308 connecting the candidate position 306 and the target position 305 changes in real time. That is, transition from the candidate position 306A to the candidate position 306B causes transition from the arrow 308A to an arrow 308B. Since the radio-wave irradiation range 307 changes in real time, the user can confirm overlapping between the target detection area 303 and the radio-wave irradiation range 307 while moving the candidate position 306. As a result, the user can easily search for a candidate position that forms the radio-wave irradiation range 307 that largely overlaps the target detection area 303.

The non-irradiation range determination unit 118 determines the non-irradiation ranges 314A, 314B for each candidate position 306 that changes. The display control unit 112 displays, in real time, the non-irradiation ranges 314A, 314B determined by the non-irradiation range determination unit 118.

Movement from the candidate position 306A to the candidate position 306B causes transition from a non-irradiation range 314AA to a non-irradiation range 314AB, and causes transition from a non-irradiation range 314BA to a non-irradiation range 314BB. The non-irradiation ranges 314AA, 314AB are areas where the radio wave is blocked by the traffic signal pole 309A, and the non-irradiation ranges 314BA, 314BB are areas where the radio wave is blocked by the traffic signal pole 309B.

Referring back to FIG. 3, the candidate position designation unit 115 can receive, from the user, designation of an area including a plurality of candidate positions 306 in the image 108A. The radio-wave irradiation range determination unit 116 determines a radio-wave irradiation range 307 for each candidate position 306 included in the designated area. The non-irradiation range determination unit 118 determines non-irradiation ranges 314A, 314B for each candidate position 306 included in the designated area.

The evaluation unit 119 evaluates each candidate position 306 included in the designated area, based on the radio-wave irradiation range 307, the non-irradiation ranges 314A, 314B, and the target detection area 303. In a specific example, the evaluation unit 119 determines the rank of each candidate position 306 included in the designated area. The display control unit 112 causes the display device 203 to display a plurality of marks respectively corresponding to the plurality of candidate positions 306, in the area designated by the user in the image 108A.

Figure 10:
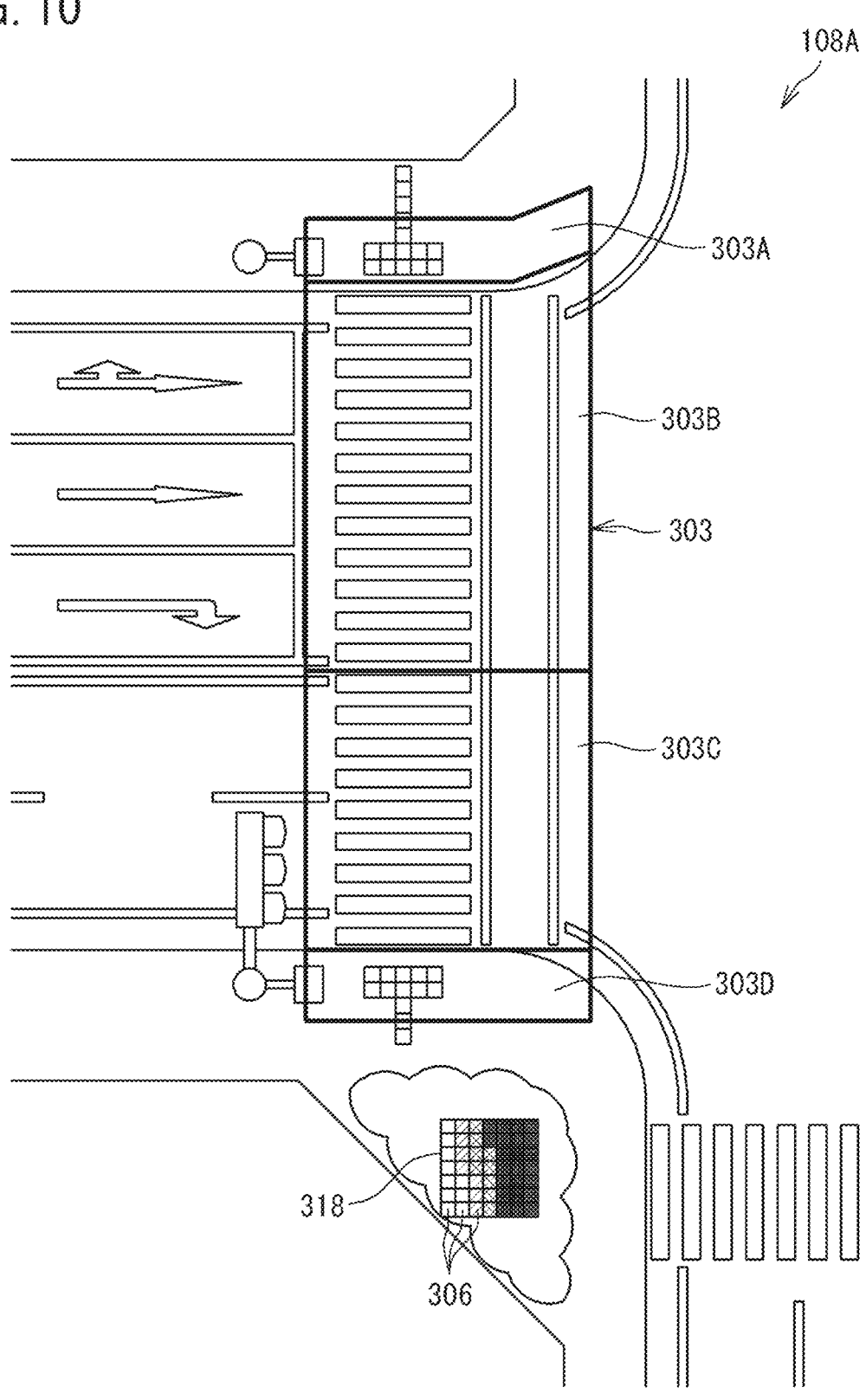
FIG. 10 shows an example of an installation position determination screen in a case where an area including a plurality of candidate positions is designated.

FIG. 10 shows an example of the installation position determination screen in the case where an area including a plurality of candidate positions is designated. The user can designate an area 318 including a plurality of candidate positions 306 (hereinafter referred to as "candidate area") by, for example, a mouse operation while operating the input device 201. The candidate area 318 is, for example, a rectangular area. The candidate area 318 is an aggregate of a plurality of unit areas, and each unit area is a candidate position 306. The unit area is, for example, a rectangular area.

The evaluation results of the respective candidate positions 306 included in the candidate area 318 are displayed in the candidate area 318. That is, marks indicating the ranks of the respective candidate positions 306 are listed in the candidate area 318. Therefore, the user can collectively confirm the ranks of the respective candidate positions 306 included in the candidate area 318 by confirming the marks included in the candidate area 318.

When the candidate area 318 has been designated, the radio-wave irradiation range 307 and the non-irradiation ranges 314A, 314B corresponding to each candidate position 306 are determined. When the candidate area 318 has been designated, the radio-wave irradiation range 307 and the non-irradiation ranges 314A, 314B are not displayed in the image 108A. This avoids complication due to the radio-wave irradiation ranges 307 and the non-irradiation ranges 314A, 314B being displayed.

Figure 11:
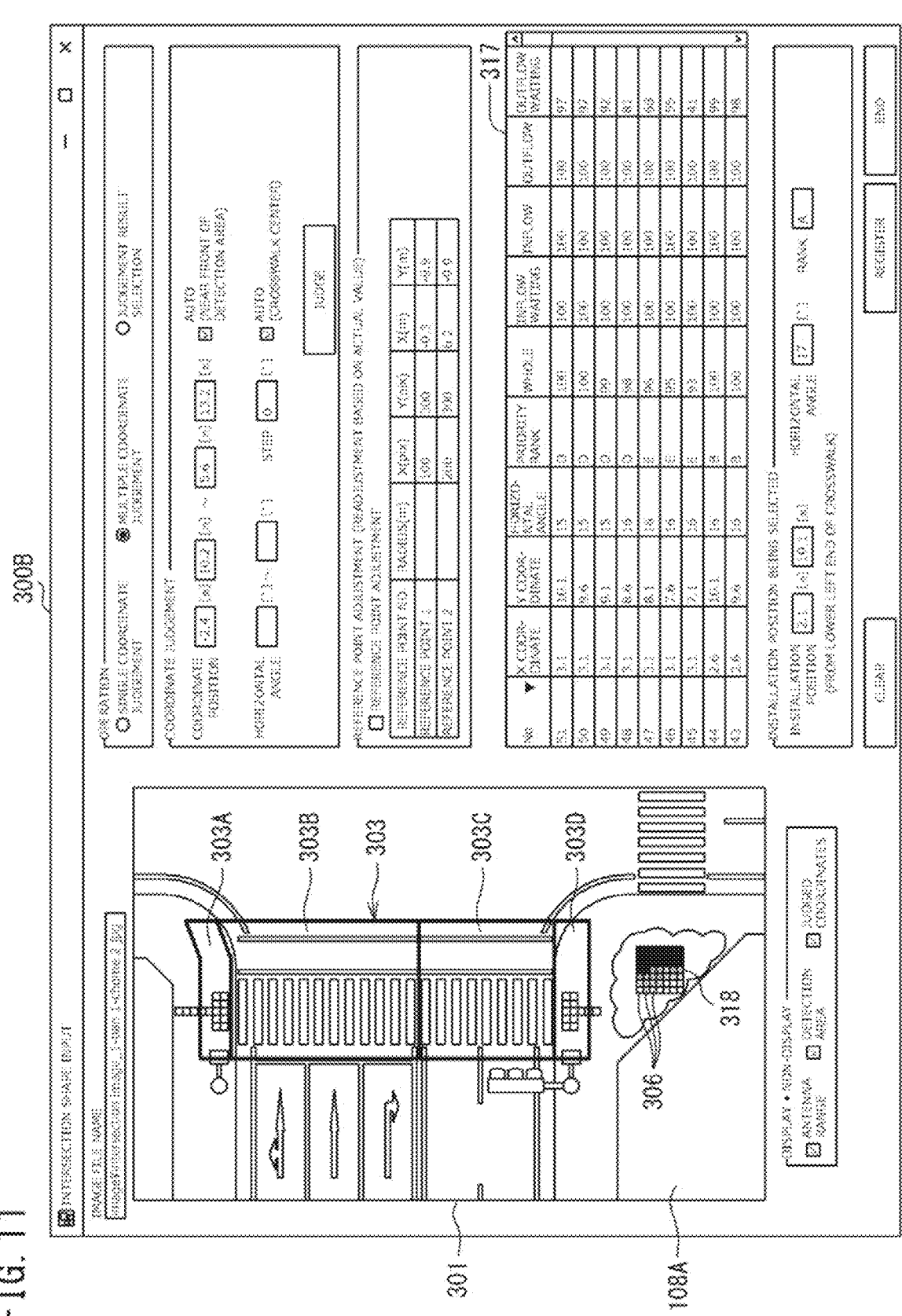
FIG. 11 shows an example of an installation position determination screen in which evaluation results of a plurality of candidate positions are displayed.

The display control unit 112 causes the display device 203 to display the evaluation results of the plurality of candidate positions 306 on the installation position determination screen. FIG. 11 shows an example of the installation position determination screen on which the evaluation results of the plurality of candidate positions are displayed. When the evaluation results of the respective candidate positions 306 included in the candidate area 318 have been obtained, an installation position determination screen 300B including an evaluation result display section 317 indicating the evaluation results of the candidate positions 306 is displayed. In the evaluation result display section 317, the evaluation results of the candidate positions 306 included in the candidate area 318 are listed and displayed. The display items in the evaluation result display section 317 are identical to the display items in the evaluation result display section 317 shown in FIG. 8.

The user can determine one candidate position 306 as an installation position of the infrastructure radio-wave sensor 10, taking into consideration the evaluation results of the candidate positions 306 described above. Referring back to FIG. 3, the report creation unit 120 creates a report for installing the infrastructure radio-wave sensor 10 at the candidate position 306, based on the target position 305 determined by the target position determination unit 114 and the candidate position 306 received by the candidate position designation unit 115. The output unit 121 outputs the report created by the report creation unit 120. In a specific example, the output unit 121 outputs data for printing the report, to the printer 202, and the printer 202 prints the report. The output unit 121 may cause the display device 203 to display the report.

Figure 12:
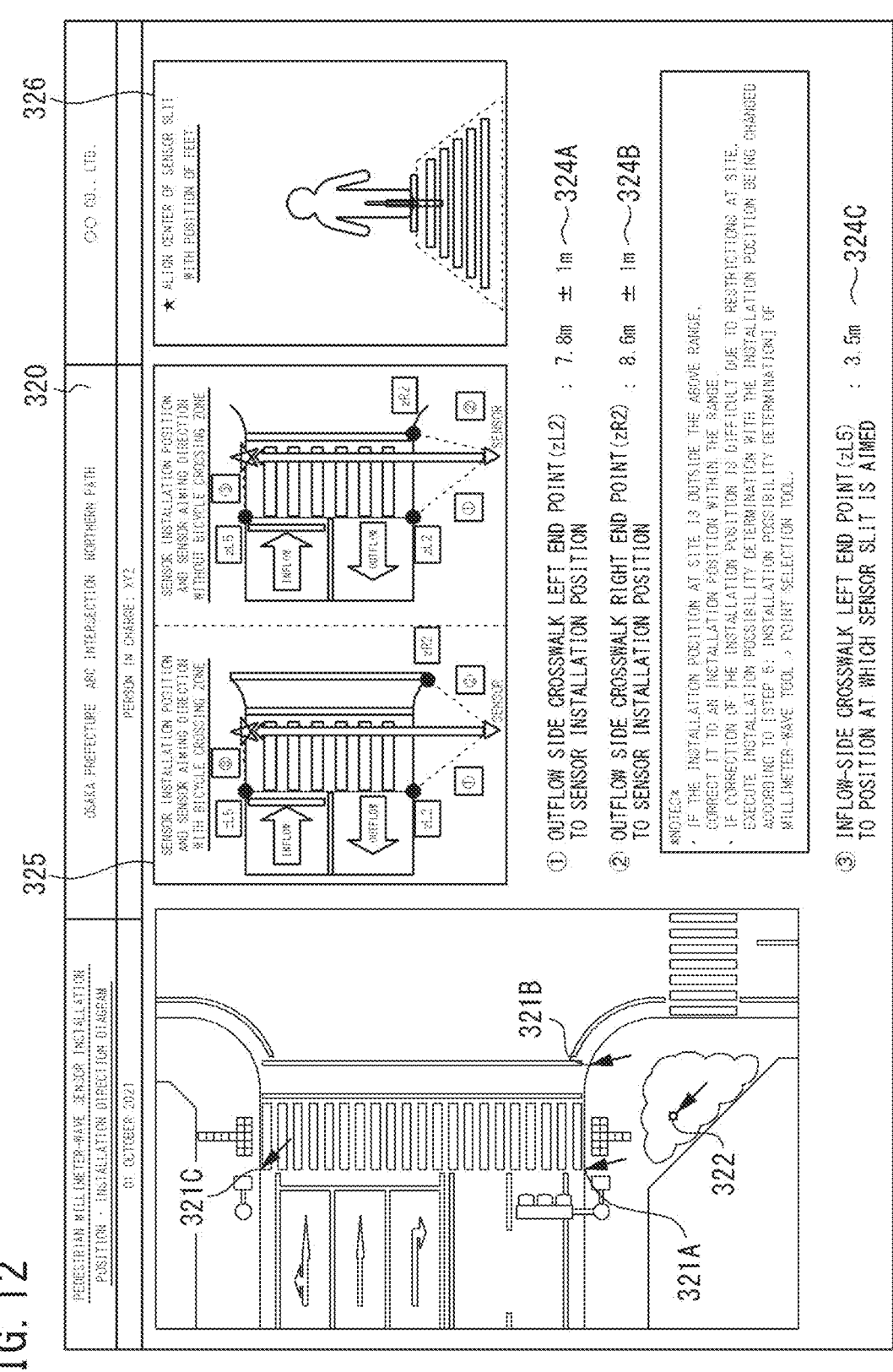
FIG. 12 shows an example of a report.

FIG. 12 shows an example of the report. A report 320 includes information used for installing the infrastructure radio-wave sensor 10 at the candidate position 306 (hereinafter referred to as "installation position 322") determined as an installation position of the infrastructure radio-wave sensor 10. The report 320 includes the image 108A including the crosswalk. In the image 108A, a first reference point 321A, a second reference point 321B, a third reference point 321C, and an installation position 322 are shown. The first reference point 321A and the second reference point 321B are information for specifying the installation position 322. The third reference point 321C is information for specifying the target position 305.

Referring back to FIG. 4, the installation position determination screen 300 includes a reference point setting section 323. The reference point setting section 323 is an area for the user to set the first reference point 321A and the second reference point 321B. The reference point setting section 323 includes a plurality of input boxes for inputting the coordinate values of the first reference point 321A and the second reference point 321B. The user can designate the first reference point 321A and the second reference point 321B in the image 108A by inputting the coordinate values to the input boxes in the reference point setting section 323, or by clicking and designating any points in the image 108A being displayed.

The first reference point 321A and the second reference point 321B are points that serve as markers for specifying the installation position in the site. Therefore, it is preferable that the first reference point 321A and the second reference point 321B are points that the operator can easily recognize in the site. In the example shown in FIG. 11, the first reference point 321A and the second reference point 321B are the zebra lower left end 311G and the zebra lower right end 311H, respectively. The installation assistance device 100 can adopt, as the default values of the first reference point 321A and the second reference point 321B, two points out of the zebra upper left end 311C, the zebra upper right end 311D, the outflow boundary upper left end 311E, the outflow boundary upper right end 311F, the zebra lower left end 311G, and the zebra lower right end 311H (see FIG. 5), for example.

The installation assistance device 100 may receive, from the user, designation of the third reference point 321C in the image 108A. For example, the reference point setting section 323 may include an input box for inputting the coordinate values of the third reference point 321C. The user may be able to designate the third reference point 321C in the image 108A by inputting the coordinate values to the input boxes in the reference point setting section 323, or by clicking and designating any points in the displayed image 108A.

The third reference point 321C is a point that serves as a marker for specifying the target position 305 in the site. Therefore, it is preferable that the third reference point 321C is a point that the operator can easily recognize in the site. In the example shown in FIG. 11, the third reference point 321C is the zebra upper left end 311C. The installation assistance device 100 can adopt, as a default value of the third reference point 321C, one of the zebra upper left end 311C and the zebra upper right end 311D, for example.

Referring back to FIG. 12, the report 320 includes distance information 324A from the first reference point 321A to the installation position 322, and distance information 324B from the second reference point 321B to the installation position 322. The distance between the installation position 322 and each of the first reference point 321A and the second reference point 321B is calculated based on a preset scale of the image 108A. The distance information 324A includes information about a reference distance and an allowable margin. In the example shown in FIG. 12, the distance information 324A is 7.8 m±1 m, the reference distance is 7.8 m, and the margin is ±1 m. The distance information 324B is 8.6 m±1 m, the reference distance is 8.6 m, and the margin is ±1 m. The operator in the site can measure the actual distance from the first reference point 321A and the second reference point 321B to specify the installation position 322.

The report 320 includes guide information 325 that guides a method for specifying the installation position 322 from the first reference point 321A and the second reference point 321B. The guide information 325 allows the operator to know the method for specifying the installation position 322 from the first reference point 321A and the second reference point 321B.

The report 320 includes distance information 324C from the third reference point 321C to the target position 305. The distance between the third reference point 321C and the target position 305 is calculated based on the scale of the image 108A. In the example shown in FIG. 12, the distance information 324C is 3.5 m. The operator measures the actual distance from the third reference point 321C in the site to specify the target position 305.

The report 320 includes guide information 326 that provides guidance on a method for setting the angle of the infrastructure radio-wave sensor 10. In the example shown in FIG. 12, the guide information 326 provides guidance on a method for aligning the center of the radio wave irradiation direction with the target position 305 by using a sighting device fixed to the housing of the infrastructure radio-wave sensor 10. The guide information 326 allows the operator to grasp the angle setting method for the infrastructure radio-wave sensor 10.

A method for the operator to install the infrastructure radio-wave sensor 10 by using the report 320 will be described. The operator specifies the first reference point 321A and the second reference point 321B designated in the report 320, at the site of the crosswalk. The operator measures the distances from the first reference point 321A and the second reference point 321B, and specifies, as the installation position 322, a position at which the distance from the first reference point 321A matches the distance information 324A, and the distance from the second reference point 321B matches the distance information 324B.

The operator adjusts the position and the angle of the structure 50 according to need, and mounts the infrastructure radio-wave sensor 10 to the structure 50 such that the infrastructure radio-wave sensor 10 is positioned at the installation position 322. In this case, the operator can adjust the mounting position of the infrastructure radio-wave sensor 10 within the margin designated in the report 320.

The operator specifies the third reference point 321C designated in the report 320, in the site of the crosswalk. The operator measures the distance from the third reference point 321C, and specifies, as the target position 305, a position at which the distance from the third reference point 321C matches the distance information 324C. The operator adjusts the angle of the infrastructure radio-wave sensor 10 so as to aim at the target position 305, by using the sighting device (not shown) mounted to the infrastructure radio-wave sensor 10. Thus, installation of the infrastructure radio-wave sensor 10 is completed.

4. Operation of Installation Assistance Device

The installation assistance program 107 being started by the processor 101 allows the installation assistance device 100 to execute an image inputting process, a target detection area determination process, an obstacle setting process, a first installation position determination assistance process, a second installation position determination assistance process, and a report outputting process which are described below.

Figure 13:
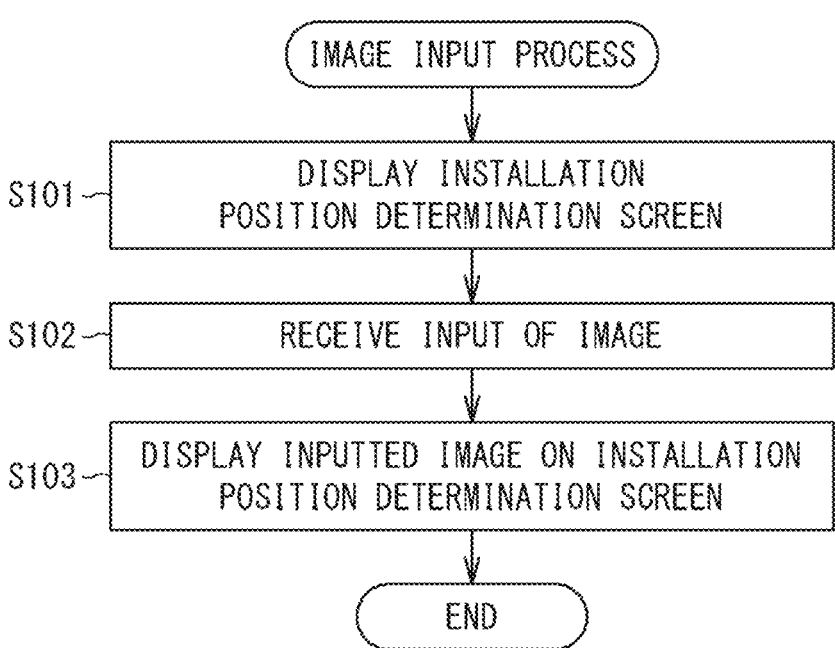
FIG. 13 is a flowchart showing an example of a procedure of an image inputting process.

FIG. 13 is a flowchart showing an example of the procedure of the image inputting process. The processor 101 causes display device 203 to display the installation position determination screen 300 (step S101). The user can designate image data 108 to be inputted by pressing the button 302 while operating the input device 201 (see FIG. 4). The processor 101 receives the input of the image data 108 (image 108A) (step S102). The processor 101 causes the display device 203 to display the inputted image 108A on the display area 301 of the installation position determination screen 300 (step S103). This is the end of the image inputting process.

Figure 14:
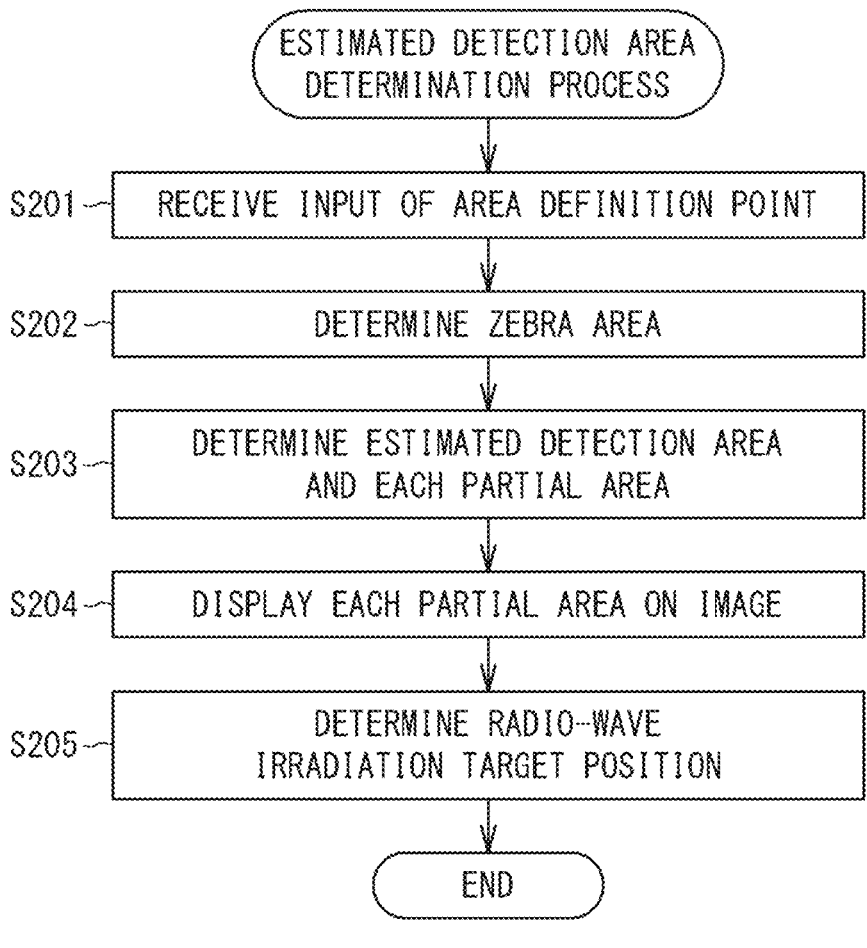
FIG. 14 is a flowchart showing an example of a procedure of a target detection area determination process.

FIG. 14 is a flowchart showing an example of the procedure of the target detection area determination process. The user can input the area definition points 311A to 311H by inputting the coordinate values to the input boxes in the zebra setting section 319, or by clicking and designating the points on the displayed image 108A. The processor 101 receives the input of the area definition points 311A to 311H that define the zebra area 304 (step S201).

The processor 101 determines the zebra area 304 (see FIG. 5) based on the inputted area definition points 311A to 311H (step S202). Based on the determined zebra area 304, the processor 101 determines the target detection area 303 as well as the inflow-side waiting area 303A, the inflow-side zebra area 303B, the outflow-side zebra area 303C, and the outflow-side waiting area 303D (step S203).

The processor 101 causes the display device 203 to display the determined partial areas. i.e., the inflow-side waiting area 303A, the inflow-side zebra area 303B, the outflow-side zebra area 303C, and the outflow-side waiting area 303D so as to be superimposed on the image 108A (step S204).

The processor 101 determines the target position 305 of radio-wave irradiation, based on the determined partial areas, or an input performed by the user, for example (step S205). This is the end of the target detection area determination process.

Figure 15:
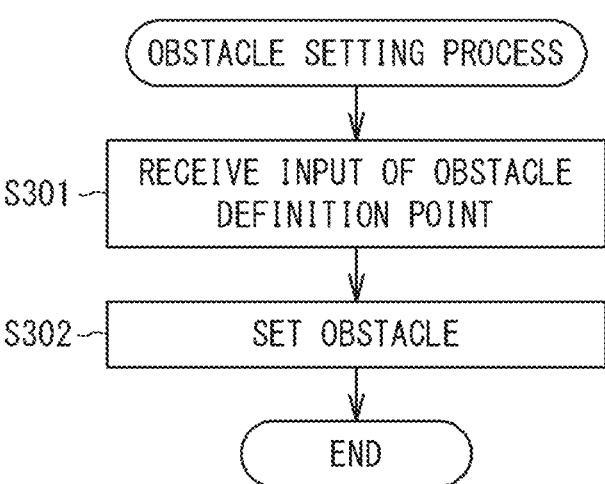
FIG. 15 is a flowchart showing an example of a procedure of an obstacle setting process.

FIG. 15 is a flowchart showing an example of the procedure of the obstacle setting process. The user can input a definition point of an obstacle to the installation assistance device 100 by inputting coordinate values to each input box in the obstacle setting section 313, or by clicking and designating the definition point of the obstacle in the displayed image 108A. The processor 101 receives the input of the definition point of the obstacle (step S301). Based on the inputted definition point, the processor 101 sets the obstacle of radio-wave irradiation (step S302). This is the end of the obstacle setting process.

Figure 16:
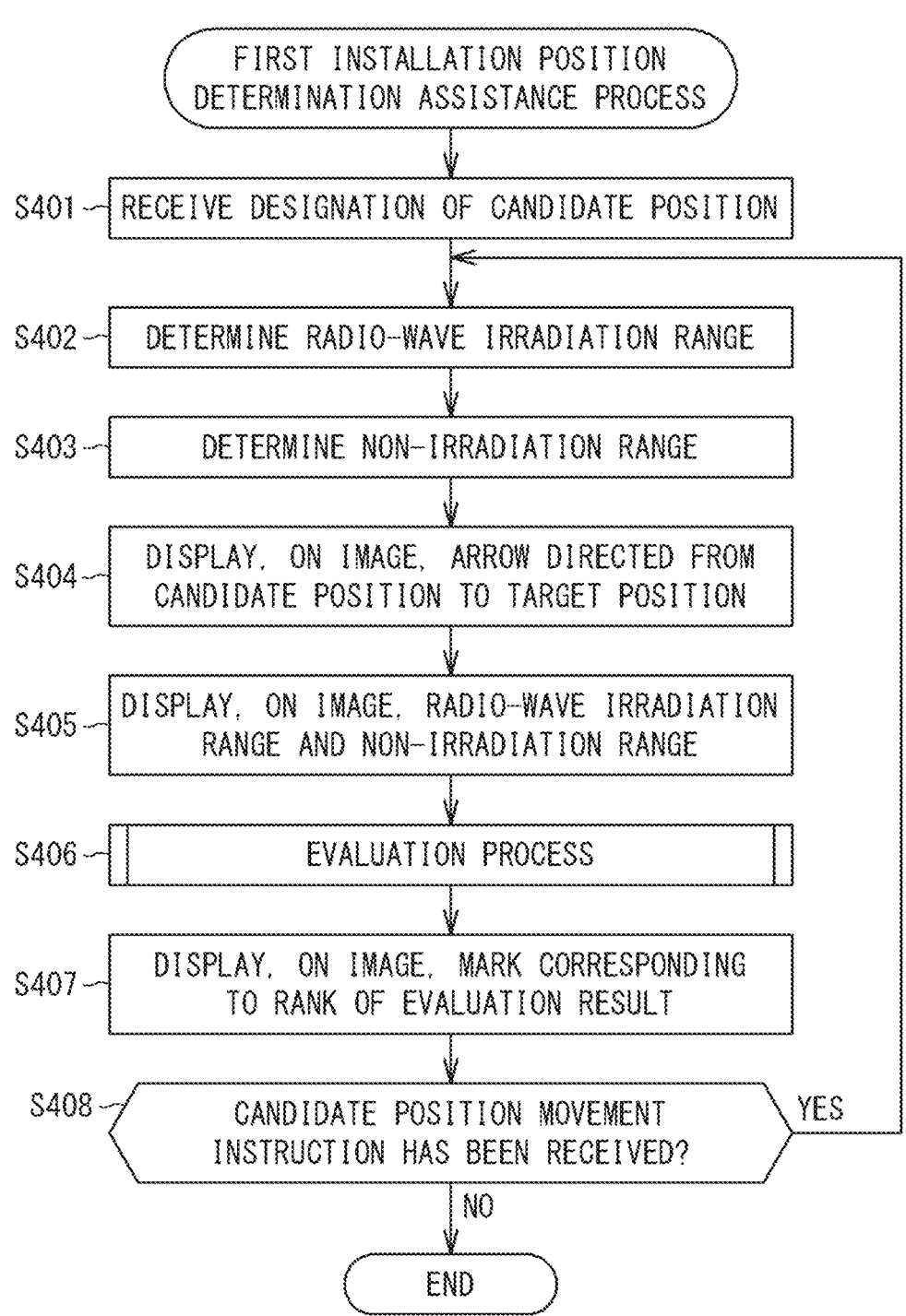
FIG. 16 is a flowchart showing an example of a procedure of a first installation position determination assistance process.

FIG. 16 is a flowchart showing an example of the procedure of the first installation position determination assistance process. The user can designate the candidate position 306 by, for example, clicking a desired point in the image 108A while operating the input device 201. The processor 101 receives the designation of the candidate position 306 from the user (step S401).

The processor 101 determines the radio-wave irradiation range 307, based on the designated candidate position 306, and the target position 305 (step S402). Furthermore, the processor 101 determines the non-irradiation ranges 314A, 314B, based on the designated candidate position 306, and the set obstacle (traffic signal poles 309A, 309B) (step S403).

The processor 101 causes the display device 203 to display the arrow 308 directed from the candidate position 306 to the target position 305, so as to be superimposed on the image 108A (step S404). Furthermore, the processor 101 causes the display device 203 to display the determined radio-wave irradiation range 307 and non-irradiation ranges 314A, 314B so as to be superimposed on the image 108A (step S405).

Figure 17:
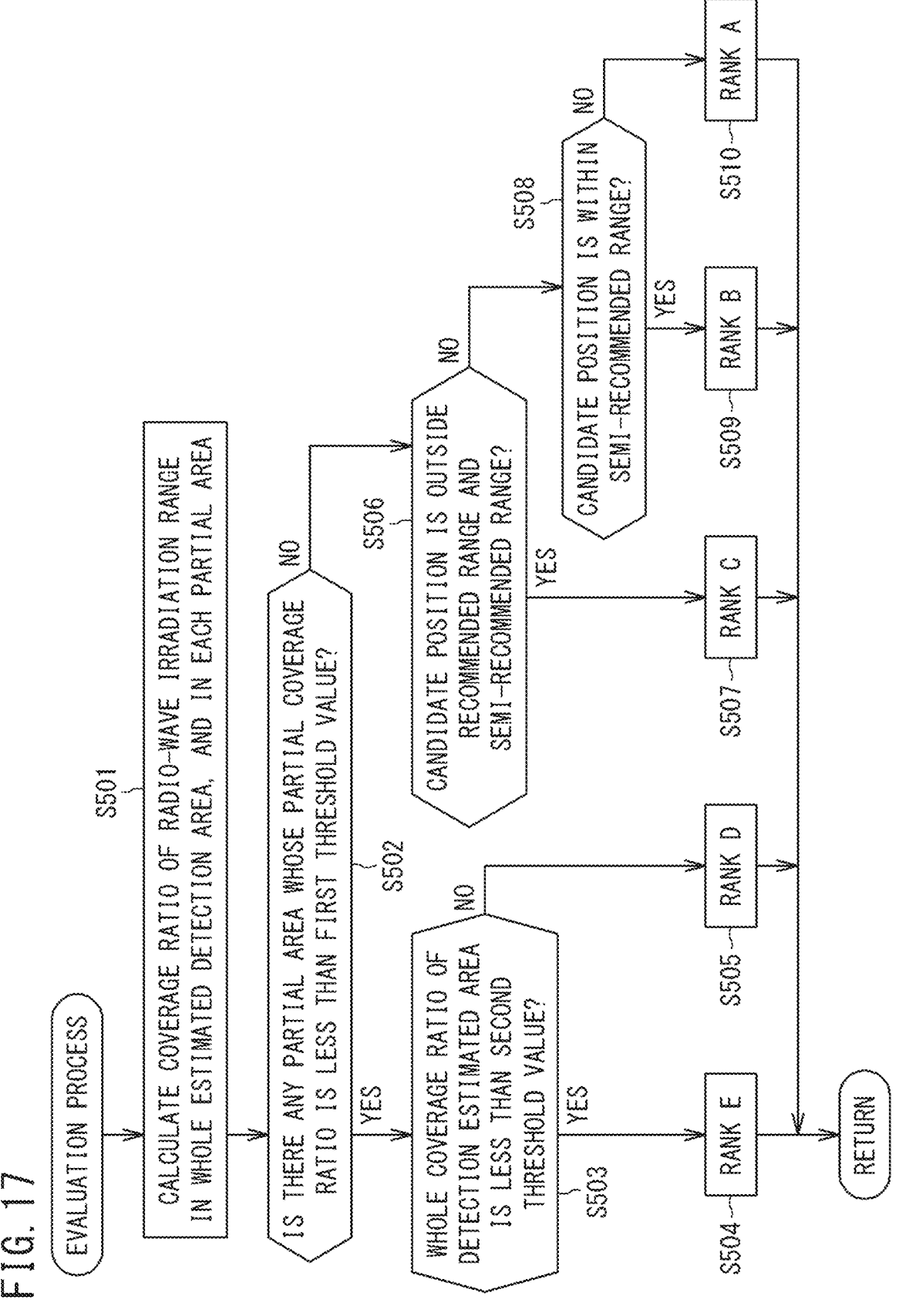
FIG. 17 is a flowchart showing an example of a procedure of an evaluation process.

The processor 101 executes an evaluation process of evaluating the candidate position 306 (step S406). FIG. 17 is a flowchart showing an example of the procedure of the evaluation process.

The processor 101 calculates the coverage ratio (whole coverage ratio) of the radio-wave irradiation range 307 in the whole target detection area 303, and calculates the coverage ratio (partial coverage ratio) of the radio-wave irradiation range 307 in each partial area (step S501).

The processor 101 determines whether or not there is a partial area whose the partial coverage ratio is less than the first threshold value (step S502).

When there is a partial area whose partial coverage ratio is less than the first threshold value (YES in step S502), the processor 101 determines whether or not the whole coverage ratio is less than the second threshold value (step S503).

When the whole coverage ratio is less than the second threshold value (YES in step S503), the processor 101 determines the rank of the candidate position 306 as "E" (step S504).

When the whole coverage ratio is equal to or greater than the second threshold value (NO in step S503), the processor 101 determines the rank of the candidate position 306 as "D" (step S505).

When the partial coverage ratios of all the partial areas are equal to or greater than the first threshold value (NO in step S502), the processor 101 determines whether or not the candidate position 306 is outside the recommended range 315A and the semi-recommended range 315B, i.e., whether or not the candidate position 306 is in the non-recommended range 315C (step S506).

When the candidate position 306 is in the non-recommended range 315C (YES in step S506), the processor 101 determines the rank of the candidate position 306 as "C" (step S507).

When the candidate position 306 is in the recommended range 315A or the semi-recommended range 315B (NO in step S506), the processor 101 determines whether or not the candidate position 306 is in the semi-recommended range 315B (step S508).

When the candidate position 306 is in the semi-recommended range 315B (YES in step S508), the processor 101 determines the rank of the candidate position 306 as "B" (step S509).

When the candidate position 306 is outside the semi-recommended range 315B. i.e., when the candidate position 306 is in the recommended range 315A (NO in step S508), the processor 101 determines the rank of the candidate position 306 as "A" (step S510). This is the end of the evaluation process.

Referring back to FIG. 16, the processor 101 causes the display device 203 to display a mark according to the rank of the evaluation result at the candidate position 306 in the image 108A (step S407). The processor 101 causes the display device 203 to display information such as the coordinate values and the rank of the candidate position 306, in the evaluation result display section 317 of the installation position determination screen 300A.

The user can input an instruction to move the candidate position 306 to the installation assistance device 100 by operating the input device 201. The processor 101 determines whether or not an instruction of the user to move the candidate position 306 has been received (step S408). When an instruction of the user to move the candidate position 306 has been received (YES in step S408), the processor 101 returns to step S402. Thus, the display of the radio-wave irradiation range 307 and the non-irradiation ranges 314A, 314B is updated, and the rank of a new candidate position 306 is determined.

When an instruction of the user to move the candidate position 306 has not been given to the installation assistance device 100 (NO in step S408), the first installation position determination assistance process is ended.

Figure 18:
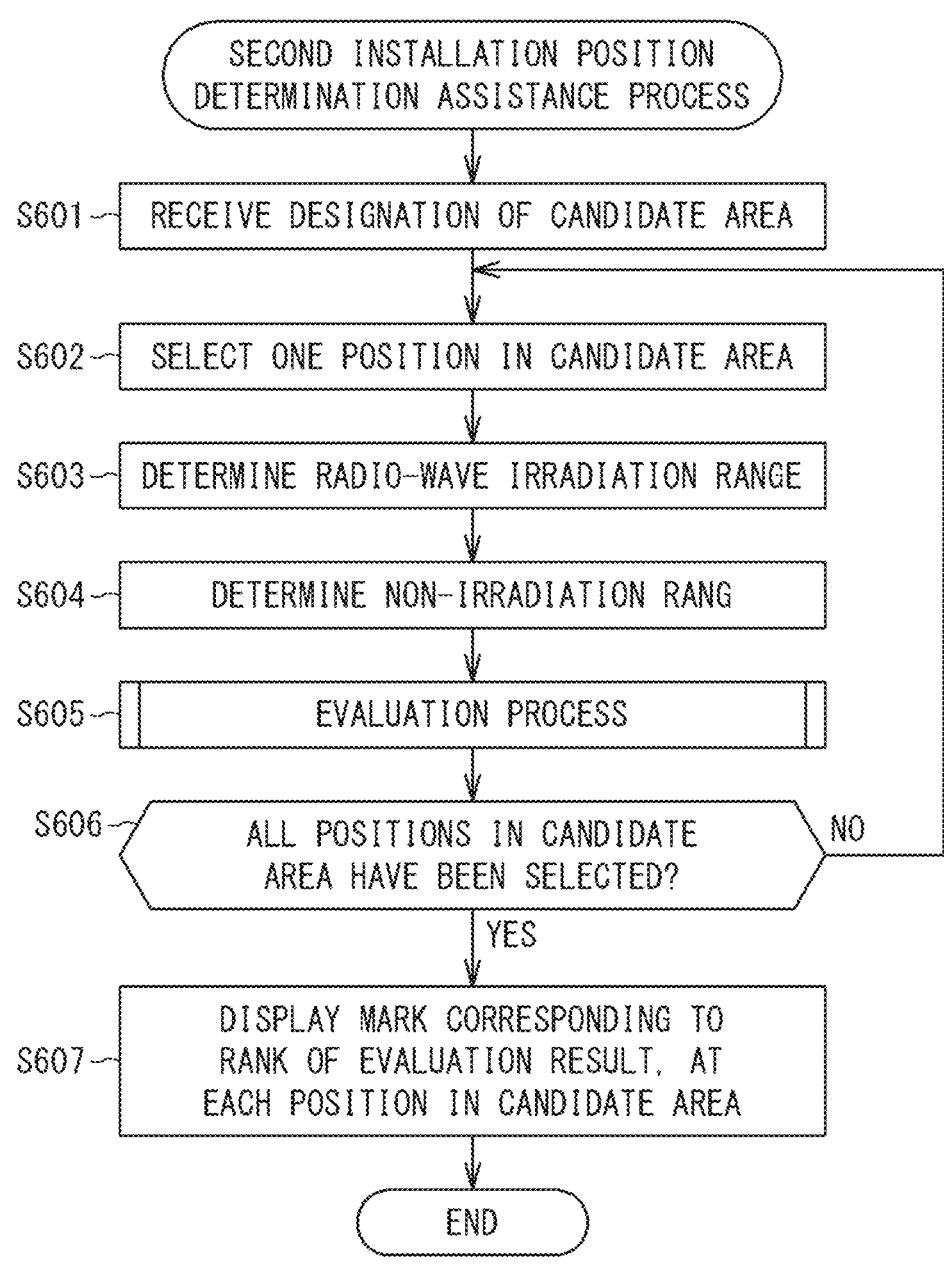
FIG. 18 is a flowchart showing an example of a procedure of a second installation position determination assistance process.

FIG. 18 is a flowchart showing an example of the procedure of the second installation position determination assistance process. The user can designate the candidate area 318 by designating a desired range in the image 108A through dragging and dropping while operating the input device 201. The processor 101 receives the designation of the candidate area 318 from the user (step S601).

The processor 101 selects one position (candidate position 306) in the designated candidate area 318 (step S602).

The processor 101 determines the radio-wave irradiation range 307, based on the selected candidate position 306 and the target position 305 (step S603). Furthermore, the processor 101 determines the non-irradiation ranges 314A, 314B, based on the selected candidate position 306 and the set obstacle (traffic signal poles 309A, 309B) (step S604).

The processor 101 executes the above evaluation process (step S605).

The processor 101 determines whether or not all the positions in the candidate area 318 have been selected (step S606). If unselected positions remain (NO in step S606), the processor 101 returns to step S602, and selects one of the unselected positions (step S602). The processor 101 executes the processes in step S603 and subsequent steps.

When all the positions in the candidate area 318 have been selected (YES in step S606), the processor 101 causes the display device 203 to display a mark corresponding to the rank of the evaluation result at each position in the candidate area 318 on the image 108A (step S607). The processor 101 causes the display device 203 to display, in a list form, information such as the coordinate values and the ranks of the respective candidate positions 306, in the evaluation result display section 317 of the installation position determination screen 300B. This is the end of the second installation position determination assistance process.

Figure 19:
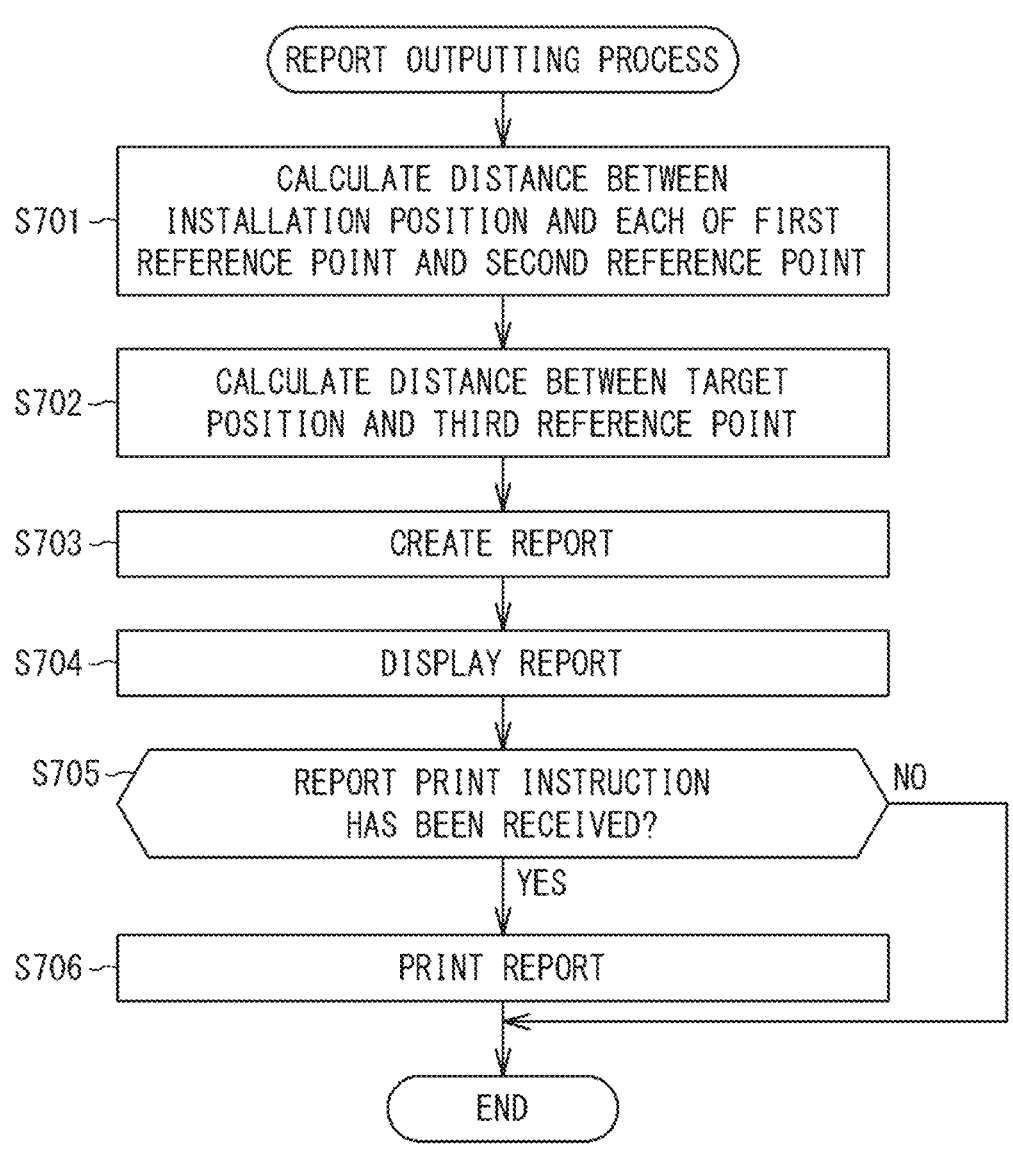
FIG. 19 is a flowchart showing an example of a procedure of a report outputting process.

FIG. 19 is a flowchart showing an example of the procedure of the report outputting process. After the evaluation result of the candidate position 306 has been outputted, the user can input an instruction to create a report, to the installation assistance device 100. Upon receiving the instruction to create a report from the user, the processor 101 calculates a distance between the installation position 322 and each of the first reference point 321A and the second reference point 321B, based on the scale of the image 108A, and the distance between the installation position 322 and each of the first reference point 321A and the second reference point 321B on the image 108A (step S701).

The processor 101 calculates the distance between the target position 305 and the third reference point 321C, based on the scale of the image 108A, and the distance between the target position 305 and the third reference point 321C on the image 108A (step S702).

The processor 101 creates the report 320 by using the installation position 322, the first reference point 321A, the second reference point 321B, the third reference point 321C, the distance between the installation position 322 and each of the calculated first reference point 321A and second reference point 321B, and the distance between the target position 305 and the third reference point 321C (step S703). The processor 101 causes the display device 203 to display the formed report 320 (step S704).

The user can input an instruction to print the displayed report 320, to the installation assistance device 100. The processor 101 determines whether or not an instruction of the user to print the report 320 is received (step S705).

When the instruction to print the report 320 has been received (YES in step S705), the processor 101 outputs, to the printer 202, a report print command and data for printing, and causes the printer 202 to print the report (step S706). After the printer 202 has printed the report 320, the processor 101 ends the report outputting process. If there is no instruction to print the report 320 from the user, the processor 101 ends the report outputting process without causing the printer 202 to print the report 320.

5. Modification

In the above-described embodiment, the installation assistance device 100 evaluates the candidate position 306, based on overlapping between the radio-wave irradiation range 307 and the target detection area 303. However, the present disclosure is not limited thereto. For example, the installation assistance device 100 may evaluate the candidate position 306, based on overlapping between the radio-wave irradiation range 307 and the zebra area 304.

6. Effects

The installation assistance device 100 includes the target position determination unit 114, the candidate position designation unit 115, and the display control unit 112. The target position determination unit 114 determines the target position 305 to be irradiated with the radio wave from the infrastructure radio-wave sensor 10, in the image 108A including the crosswalk. The candidate position designation unit 115 receives, from the user, designation of the candidate position 306 that is a candidate for an installation position of the infrastructure radio-wave sensor 10 in the image 108A. The display control unit 112 causes the display device 203 to display the radio-wave irradiation range 307 of the infrastructure radio-wave sensor 10 so as to be superimposed on the image 108A. The radio-wave irradiation range 307 is determined based on the determined target position 305 and the designated candidate position 306. The candidate position designation unit 115 can receive, from the user, an instruction to move the designated candidate position 306. When the candidate position designation unit 115 has received the instruction to move the candidate position 306, the display control unit 112 changes the shape of the radio-wave irradiation range 307 according to the instructed movement of the candidate position 306, with the target position 305 being fixed. This allows the user to visually recognize the change in the shape of the radio-wave irradiation range 307 when the candidate position 306 is moved.

The installation assistance device 100 may include the input device 201. The input device 201 is used for designating coordinates in the image 108A. The candidate position designation unit 115 may receive a continuous change in the coordinates designated in the input device 201 by the user, as the instruction to move the candidate position 306. The display control unit 112 may change, in real time, the shape of the radio-wave irradiation range 307 according to the continuous change in the specified coordinates. This allows the user to confirm, in real time, the change in the shape of the radio-wave irradiation range 307 according to the continuous change in the coordinates in the image 108A.

The display control unit 112 may cause the display device 203 to display a straight line or a line segment that connects the target position 305 and the candidate position 306, so as to be superimposed on the image 108A and the radio-wave irradiation range 307. This allows the user to visually recognize the reference direction of radio-wave irradiation that connects the target position 305 and the candidate position 306.

The straight line or the line segment may be the arrow 308 directed from the candidate position 306 to the target position 305. This allows the user to visually recognize from where to where the radio wave is emitted.

The display control unit 112 may cause the display device 203 to display the target detection area 303 so as to be superimposed on the image 108A and the radio-wave irradiation range 307. The target detection area 303 is estimated to be the detection area 30 for the infrastructure radio-wave sensor 10 to detect an object. This allows the user to visually recognize overlapping between the target detection area 303 and the radio-wave irradiation range 307.

The target detection area 303 may be divided into the plurality of partial areas 303A to 303D. The display control unit 112 may cause the display device 203 to display each of the partial areas 303A to 303D so as to be superimposed on the image 108A and the radio-wave irradiation range 307. This allows the user to visually recognize overlapping between the radio-wave irradiation range 307 and each of the partial areas 303A to 303D.

The display control unit 112 may display the non-irradiation ranges 314A. 314B in which the radio wave emitted from the infrastructure radio-wave sensor 10 is blocked by objects, so as to be superimposed on the image 108A. The display control unit 112 may change the shapes of the non-irradiation ranges 314A, 314B according to the instructed movement of the candidate position 306. This allows the user to visually recognize a change in the shapes of the non-irradiation ranges 314A, 314B when the candidate position 306 is moved.

The display control unit 112 may control the display device 203 to display a mark that indicates the evaluation result of the candidate position 306 as an installation position of the infrastructure radio-wave sensor 10, at the candidate position 306 in the image 108A. This allows the user to visually recognize the evaluation result of the candidate position 306 as an installation position.

The candidate position designation unit 115 may receive, from the user, designation of the candidate area 318 including a plurality of candidate positions 306 in the image 108A. The display control unit 112 may cause the display device 203 to display a plurality of marks corresponding to the respective candidate positions 306, in the candidate area 318 designated by the user in the image 108A. This allows the user to visually recognize the evaluation results of the candidate positions 306 in the designated candidate area 318.

The display control unit 112 may cause the display device 203 to display the marks in colors according to the ranks of the candidate positions 306. This allows the user to visually recognize the ranks of the candidate positions 306.

The installation position determination method for the infrastructure radio-wave sensor 10 is a method for determining the installation position of the infrastructure radio-wave sensor 10 by using the installation assistance device 100 that assists in installation of the infrastructure radio-wave sensor 10. The installation position determination method for the infrastructure radio-wave sensor 10 includes a step of, in the image 108A displayed on the installation assistance device 100 and including the crosswalk, designating the candidate position 306 as a candidate for an installation position of the infrastructure radio-wave sensor 10, thereby causing the installation assistance device 100 to display the radio-wave irradiation range 307 of the infrastructure radio-wave sensor 10 so as to be superimposed on the image 108A. The radio-wave irradiation range 307 is determined based on the target position 305 to be irradiated with the radio wave emitted from the infrastructure radio-wave sensor 10 and on the designated candidate position 306. The installation position determination method for the infrastructure radio-wave sensor 10 further includes a step of instructing the installation assistance device 100 to move the designated candidate position 306, thereby causing the installation assistance device 100 to change the shape of the radio-wave irradiation range 307 according to the instructed movement of the candidate position 306, with the target position 305 being fixed. This allows the user to visually confirm the change in the shape of the radio-wave irradiation range 307 when the candidate position 306 is moved.

7. Additional Note

The embodiment disclosed herein is merely illustrative in all aspects and should not be recognized as being restrictive. The scope of the present disclosure is defined by the scope of the claims rather than by the above embodiment, and is intended to include meaning equivalent to the scope of the claims and all modifications within the scope.

REFERENCE SIGNS LIST

10 infrastructure radio-wave sensor (radio-wave sensor)
20 crosswalk
30 detection area
40 radio-wave irradiation range
50 structure
51 pole
52 arm
100 installation assistance device
101 processor
102 nonvolatile memory
103 volatile memory
104 input/output interface (I/O)
105 graphic controller
106 communication interface (communication I/F)
107 installation assistance program
108 image data
108A image
111 image input unit
112 display control unit
113 area determination unit
114 target position determination unit
115 candidate position designation unit
116 radio-wave irradiation range determination unit
117 obstacle setting unit
118 non-irradiation range determination unit 119 evaluation unit
120 report creation unit
121 output unit
201 input device
202 printer
203 display device
300, 300A, 300B installation position determination screen
301 display area
302 button
303 target detection area
303A inflow-side waiting area
303B inflow-side zebra area
303C outflow-side zebra area
303D outflow-side waiting area
304 zebra area
305 target position
306, 306A, 306B candidate position
307, 307A, 307B radio-wave irradiation range
308, 308A, 308B arrow
309A, 309B traffic signal pole
310A inflow-side road
310B outflow-side road
311A zebra center upper end (area definition point)
311B zebra center lower end (area definition point)
311C zebra upper left end (area definition point)
311D zebra upper right end (area definition point)
311E outflow boundary upper left end (area definition point)
311F outflow boundary upper right end (area definition point)
311G zebra lower left end (area definition point)
311H zebra lower right end (area definition point)
312A, 312B sidewalk
313 obstacle setting section
314A, 314B, 314AA, 314AB, 314BA, 314BB non-irradiation range
315A recommended range
315B semi-recommended range
31SC non-recommended range
317 evaluation result display section
318 candidate area
319 zebra setting section
320 report
321A first reference point
321B second reference point
321C third reference point
322 installation position
323 reference point setting section
324A, 324B, 324C distance information
325, 326 guide information

The invention claimed is:

1. A radio-wave sensor installation assistance device, comprising:
a target position determination unit configured to determine a target position to be irradiated with a radio wave emitted from a radio-wave sensor, in an image including a crosswalk;
a candidate position designation unit configured to receive, from a user, designation of a candidate position that is a candidate for an installation position of the radio-wave sensor, in the image; and
a display control unit configured to cause a display device to display a radio-wave irradiation range of the radio-wave sensor so as to be superimposed on the image, the radio-wave irradiation range being determined based on the determined target position and the designated candidate position, wherein
the candidate position designation unit is able to receive, from the user, an instruction of a movement of the designated candidate position, and
when the candidate position designation unit has received the instruction of the movement, the display control unit changes the shape of the radio-wave irradiation range according to the instructed movement of the candidate position, with the target position being fixed.

2. The radio-wave sensor installation assistance device according to claim 1, comprising an input device for designating coordinates in the image, wherein
the candidate position designation unit receives a continuous change in the coordinates designated in the input device by the user, as the instruction of the movement of the candidate position, and
the display control unit changes the shape of the radio-wave irradiation range according to the continuous change in the designated coordinates.

3. The radio-wave sensor installation assistance device according to claim 1, wherein
the display control unit causes the display device to display a straight line or a line segment that connects the target position and the candidate position, so as to be superimposed on the image and the radio-wave irradiation range.

4. The radio-wave sensor installation assistance device according to claim 3, wherein
the straight line or the line segment is an arrow directed from the candidate position to the target position.

5. The radio-wave sensor installation assistance device according to claim 1, wherein
the display control unit causes the display device to display a target detection area to be set as a detection area for the radio-wave sensor to detect an object, so as to be superimposed on the image and the radio-wave irradiation range.

6. The radio-wave sensor installation assistance device according to claim 5, wherein
the target detection area is divided into a plurality of partial areas, and
the display control unit causes the display device to display each of the plurality of partial areas so as to be superimposed on the image and the radio-wave irradiation range.

7. The radio-wave sensor installation assistance device according to claim 1, wherein
the display control unit displays a non-irradiation range in which the radio wave emitted from the radio-wave sensor is blocked by an object, so as to be superimposed on the image, and
the display control unit changes the shape of the non-irradiation range, according to the instructed movement of the candidate position.

8. The radio-wave sensor installation assistance device according to claim 1, wherein
the display control unit controls the display device to display a mark that indicates an evaluation result of the candidate position as an installation position of the radio-wave sensor, at the candidate position in the image.

9. The radio-wave sensor installation assistance device according to claim 8, wherein
the candidate position designation unit receives, from the user, designation of an area including a plurality of candidate positions in the image, and the display control unit causes the display device to display a plurality of marks corresponding to the respective candidate positions, in the area designated by the user in the image.

10. The radio-wave sensor installation assistance device according to claim 8, wherein the display control unit causes the display device to display the mark with a color according to a rank of the candidate position.

11. A non-transitory computer readable storage medium storing a computer program that causes a computer to assist in installation of a radio-wave sensor, the computer program causing the computer to function as:

a target position determination unit configured to determine a target position to be irradiated with a radio wave emitted from a radio-wave sensor, in an image including a crosswalk;

a candidate position designation unit configured to receive, from a user, designation of a candidate position that is a candidate for an installation position of the radio-wave sensor, in the image; and a display control unit configured to cause a display device to display a radio-wave irradiation range of the radio-wave sensor so as to be superimposed on the image, the radio-wave irradiation range being determined based on the determined target position and the designated candidate position, wherein the candidate position designation unit is able to receive, from the user, an instruction of a movement of the designated candidate position, and when the candidate position designation unit has received the instruction of the movement, the display control unit changes the shape of the radio-wave irradiation range according to the instructed movement of the candidate position, with the target position being fixed.

12. A radio-wave sensor installation position determination method for determining an installation position of a radio-wave sensor by using an installation assistance device that assists in installation of the radio-wave sensor, the method comprising:

in an image that is displayed on the installation assistance device and includes a crosswalk, designating a candidate position that is a candidate for an installation position of the radio-wave sensor, thereby causing the installation assistance device to display a radio-wave irradiation range of the radio-wave sensor so as to be superimposed on the image, the radio-wave irradiation range being determined based on a target position of radio-wave irradiation by the radio-wave sensor and on the designated candidate position; and instructing the installation assistance device to move the designated candidate position, thereby causing the installation assistance device to change the shape of the radio-wave irradiation range according to the instructed movement of the candidate position, with the target position being fixed.

\* \* \* \* \*